(12) United States Patent
Watanabe et al.

(10) Patent No.: US 12,430,956 B2
(45) Date of Patent: Sep. 30, 2025

(54) MANAGEMENT SYSTEM

(71) Applicant: KUBOTA CORPORATION, Osaka (JP)

(72) Inventors: Katsuhiko Watanabe, Sakai (JP); Tsuyoshi Gono, Sakai (JP); Atsushi Mima, Sakai (JP); Ryuzo Fujita, Sakai (JP); Ryosuke Kinugawa, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 237 days.

(21) Appl. No.: 18/202,323

(22) Filed: May 26, 2023

(65) Prior Publication Data

US 2023/0394893 A1 Dec. 7, 2023

(30) Foreign Application Priority Data

Jun. 7, 2022 (JP) ................ 2022-092538

(51) Int. Cl.
*B60W 10/20* (2006.01)
*G05D 1/00* (2006.01)
*G07C 5/00* (2006.01)

(52) U.S. Cl.
CPC ............ *G07C 5/008* (2013.01); *B60W 10/20* (2013.01); *G05D 1/0212* (2013.01)

(58) Field of Classification Search
CPC ..... G07C 5/008; B60W 10/20; G05D 1/0212; G05D 1/0221; G05D 1/0282; A01B 69/008
See application file for complete search history.

(56) References Cited

U.S. PATENT DOCUMENTS 10,419,902 B1\* 9/2019 Naspolini .............. A01D 91/00
2014/0156105 A1\* 6/2014 Faivre .................. G07C 5/0825
701/1

(Continued)

FOREIGN PATENT DOCUMENTS

JP 2008247281 A \* 10/2008
JP 6678865 B2 4/2020

(Continued)

OTHER PUBLICATIONS

Utsugibayashi Mikio, Mar. 30, 2007, English Machine Translation_JP 2008/247281 A provided by Patent Translate by EPO and Google (Year: 2007).\*

(Continued)

*Primary Examiner* — Ashley L Redhead, Jr.
(74) *Attorney, Agent, or Firm* — Keating & Bennett, LLP

(57) ABSTRACT

A management system includes a working vehicle and a server. The working vehicle includes a working device, a vehicle body capable of traveling by either automatic steering based on a reference line or manual steering, a position detector to detect a position of the vehicle body, a first memory to store, in a case where the vehicle body is automatically steered, correspondence information in which setting information of the working vehicle and position information of the vehicle body are associated with each other, and a first communicator to transmit the correspondence information stored in the first memory to the server. The server includes a second communicator to receive the correspondence information transmitted by the first communicator, and a second memory to store the correspondence information received by the second communicator.

18 Claims, 32 Drawing Sheets

(56) References Cited

U.S. PATENT DOCUMENTS

| | | | |
|---|---|---|---|
| 2015/0378362 A1* | 12/2015 | Hulin | A01B 37/00 |
| | | | 700/275 |
| 2020/0097851 A1* | 3/2020 | Alvarez | G06F 16/242 |
| 2020/0217263 A1* | 7/2020 | Park | F01P 11/16 |
| 2021/0200528 A1 | 7/2021 | Miura et al. | |
| 2022/0022948 A1* | 1/2022 | Fujii | A61B 1/05 |
| 2022/0083029 A1* | 3/2022 | Hunsaker | H04W 4/029 |
| 2022/0201923 A1* | 6/2022 | Adachi | G05D 1/024 |
| 2022/0389683 A1* | 12/2022 | Sawada | E02F 9/2054 |
| 2023/0134855 A1* | 5/2023 | Hodel | E02F 9/2045 |
| | | | 701/50 |
| 2023/0324917 A1* | 10/2023 | Kitai | G01S 17/42 |
| | | | 701/28 |
| 2023/0403969 A1* | 12/2023 | Christiansen | A01B 69/008 |
| 2024/0004396 A1 | 1/2024 | Akamine | |
| 2024/0248492 A1* | 7/2024 | Morita | E02F 9/24 |
| 2025/0072310 A1* | 3/2025 | Nishii | A01B 69/001 |

FOREIGN PATENT DOCUMENTS

| | | |
|---|---|---|
| JP | 2021-7334 A | 1/2021 |
| JP | 2021132598 A | 9/2021 |
| JP | 2021-192595 A | 12/2021 |
| JP | 2022062403 A | 4/2022 |
| JP | 2022077701 A | 5/2022 |

OTHER PUBLICATIONS

Watanabe et al., "Management System", U.S. Appl. No. 18/202,324, filed May 26, 2023.

Official Communication issued in corresponding European Patent Application No. 23175966.3, mailed on Nov. 17, 2023.

Official Communication issued in corresponding Japanese Patent Application No. 2022-092538, mailed on Dec. 10, 2024, 5 pages.

Official Communication issued in corresponding Japanese Patent Application No. 2022-092538, mailed on May 7, 2025, 3 pages.

* cited by examiner

Fig.8A

| Correspondence information RD | | | | | | | | | | | | |
|---|---|---|---|---|---|---|---|---|---|---|---|---|
| Time information TI | Position information PI | | Setting information SI | | | | | | | | | |
| | | | First setting information | | | | | | | Second setting information | | Third setting information |
| Time | Latitude PY | Longitude PX | D1 | D2 | D3 | D4 | D5 | D6 | D7 | FL1 | FL2 FL3 | FL4 | D8 |

1RD

| Correspondence information RD | | |
|---|---|---|
| Time information TI | Position information PI | |
| Time | Latitude PY | Longitude PX |

2RD

| Correspondence information RD | |
|---|---|
| Time information TI | Setting information SI |
| | Second setting information |
| Time | FL1 |

3RD

| Correspondence information RD | | | | | | | |
|---|---|---|---|---|---|---|---|
| Time information TI | Setting information SI | | | | | | |
| | First setting information | | | | | | Second setting information |
| Time | D1 | D2 | D3 | D4 | D5 | D6 D7 | FL4 |

| Item | Contents |
|---|---|
| Data D1 (reference line azimuth) | Value setting the azimuth of performing automatic steering |
| Data D2 (work type state) | Rotary, ridging, wet tillage, etc. |
| Data D3 (work width) | Work width that has been set (used for guidance on screen)/ridge width |
| Data D4 (overlapped width, etc.) | Overlapped width that has been set (used for guidance on screen) /the number of ridges |
| Data D5 (work route) | Type of route that has been set: turn to an adjacent line; turn by skipping one line; etc. |
| Data D6 (control gain) | Adjustment of sensitivity of control |
| Date D7 (setting status) | Method for setting reference line azimuth: calculation by acquiring start point and end point; download from server, etc. |

Fig.8B

| Item | Contents |
|---|---|
| Setting mode flag FL1 | Value indicating a state in which operations related to automatic steering are possible: acquisition of start point and end point; autonomous driving; etc. |
| Start point flag FL2 | Flag indicating that start point has been acquired (used by server to display start point acquisition position) |
| End point flag FL3 | Flag indicating that end point has been acquired (used by server to display end point acquisition position) |
| Straight-ahead travel assist flag FL4 | Value indicating that automatic steering is being performed |
| GPS latitude PY | Latitude of GPS (used to specify agricultural field, etc.) |
| GPS longitude PX | Longitude of GPS (used to specify agricultural field, etc.) |
| Data D8 (GPS positioning status) | Positioning status (single positioning, relative positioning, etc.) |

3RD (When automatic steering of vehicle body is started/ended (when FL4 is changed))

| T1 | FL4 | D1-D7 |
|---|---|---|
| t_5 | f4_1 | d_1 |
| t_8 | f4_2 | d_1 |
| t_16 | f4_3 | d_2 |

*Comparison with only D1–D7 when FL4 is changed
D1–D7 has the same value, d_1, at t_5 and t_8, and thus t_8 is deleted
D1–D7 has different values, d_1 and d_2, at t_5 and t_16, and thus t_16 is kept

2RD (When FL1 is changed)

| T1 | FL1 |
|---|---|
| t_3 | f1_1 |

1RD (Position information *every 6 seconds)

| T1 | p1 |
|---|---|
| t_1 | p_1 |
| t_2 | p_2 |
| t_4 | p_3 |
| t_6 | p_4 |
| t_7 | p_5 |
| t_9 | p_6 |
| t_10 | p_7 |
| t_11 | p_8 |
| t_12 | p_9 |
| t_13 | p_10 |
| t_14 | p_11 |
| t_15 | p_12 |
| t_17 | p_13 |

*The period defined by a double-pointed arrow is 6 seconds
t_1 to t_2 is 6 seconds, t_7 to t_9 is 6 seconds
*thinning-out is performed every minute

1RD (Position information *every 6 seconds)

| T1 | |
|---|---|
| t_1 | p_1 |
| ~~t_2~~ | ~~p_2~~ |
| ~~t_3~~ | ~~p_3~~ |
| ~~t_4~~ | ~~p_4~~ |
| t_5 | p_5 |
| ~~t_6~~ | ~~p_6~~ |
| ~~t_7~~ | ~~p_7~~ |
| ~~t_8~~ | ~~p_8~~ |
| ~~t_9~~ | ~~p_9~~ |
| ~~t_10~~ | ~~p_10~~ |
| ~~t_11~~ | ~~p_11~~ |
| ~~t_12~~ | ~~p_12~~ |
| ~~t_13~~ | ~~p_13~~ |
| ~~t_14~~ | |
| ~~t_15~~ | |
| ~~t_16~~ | |
| ~~t_17~~ | |

2RD (When FL1 is changed)

| T1 | FL1 |
|---|---|
| t_3 | fl_1 |

3RD (When automatic steering of vehicle body is started/ended (when FL4 is changed))

| T1 | FL4 | D1–D7 |
|---|---|---|
| t_5 | f4_1 | d_1 |
| ~~t_8~~ | ~~f4_2~~ | ~~d_1~~ |
| t_16 | f4_3 | d_2 |

*The period defined by a double-pointed arrow is 6 seconds
t_1 to t_2 is 6 seconds, t_7 to t_9 is 6 seconds
*thinning-out is performed every minute
✗ RD to be deleted (thinning-out of position information, deletion of redundant set values)

*Comparison with only D1–D7 when FL4 is changed
D1–D7 has the same value, d_1, at t_5 and t_8, and thus t_8 is deleted
D1–D7 has different values, d_1 and d_2, at t_5 and t_16, and thus t_16 is kept

| Agricultural field information HI | Working period information WI | Correspondence information RD | | | |
|---|---|---|---|---|---|
| | | Position information PI | Setting information SI | | |
| Agricultural field number | Time | | First setting information | Second setting information | Third setting information |
| H01 | txx001 | Pxx001 | Dxx12 | FLxx1 | Dyyy1 | ⎱ FWI1
| | ......... | ......... | ......... | ......... | ......... |
| | txx235 | Pxx235 | Dxx18 | FLxx1 | Dyyy1 |
| H02 | txx281 | Pxx281 | Dxx51 | FLxx1 | Dyyy1 | ⎱ FWI2
| | ......... | ......... | ......... | ......... | ......... |
| | txx338 | Pxx338 | Dxx54 | FLxx1 | Dyyy1 |

MANAGEMENT SYSTEM

CROSS REFERENCE TO RELATED APPLICATIONS

This application claims the benefit of priority to Japanese Patent Application No. 2022-092538 filed on Jun. 7, 2022. The entire contents of this application are hereby incorporated herein by reference.

BACKGROUND OF THE INVENTION

1. Field of the Invention

The present invention relates to a management system that manages information regarding work by a working vehicle in an agricultural field.

2. Description of the Related Art

Japanese Unexamined Patent Application Publication No. 2021-7334 describes a management system that supports a first working vehicle and a second working vehicle. The first working vehicle includes a vehicle body capable of traveling by either manual steering with a steering wheel or automatic steering based on a travel reference line, and a registration switch to set a travel reference line. The second working vehicle includes a vehicle body capable of traveling by either automatic steering based on a travel reference line or manual steering. This management system includes a server including a memory and a communicator. The memory stores reference information regarding a travel reference line set by the first working vehicle. The communicator transmits the reference information stored in the memory to the second working vehicle. This configuration enables the reference information to be easily shared with the second working vehicle.

SUMMARY OF THE INVENTION

However, the management system described in Japanese Unexamined Patent Application Publication No. 2021-7334 is incapable of causing the server to store setting information and position information of a working vehicle every time the working vehicle is automatically steered in an agricultural field. Thus, it is impossible to manage, in units of pieces of work, the setting information of the working vehicle set in agricultural field work.

Preferred embodiments of the present invention provide management systems each capable of managing, in units of pieces of work, setting information of a working vehicle set in agricultural field work.

A management system according to a preferred embodiment of the present invention includes a working vehicle and a server. The working vehicle includes a working device, a vehicle body capable of traveling by either automatic steering based on a reference line or manual steering, a position detector to detect a position of the vehicle body, a timer, a first memory to store in a case where the vehicle body is automatically steered correspondence information in which time information measured by the timer and at least one of setting information of the working vehicle or position information of the vehicle body are associated with each other, and a first communicator to transmit the correspondence information stored in the first memory to the server. The server includes a second communicator to receive the correspondence information transmitted by the first communicator, and a second memory to store the correspondence information received by the second communicator.

The working vehicle may include a steering changeover switch to be instructed to start and end automatic steering, an automatic steering mechanism to perform automatic steering of the vehicle body based on the position of the vehicle body detected by the position detector and the reference line, in response to the steering changeover switch being instructed to start automatic steering, and a controller to generate the correspondence information and cause the first memory to store the correspondence information, in response to the steering changeover switch being instructed to start or end automatic steering.

The controller may be configured or programmed to generate the correspondence information and to cause the first memory to store the correspondence information, in response to an instruction to change the setting information of the working vehicle being provided.

Every time a predetermined first period elapses, the controller may be configured or programmed to generate, as the correspondence information, first correspondence information in which the time information and the position information are associated with each other, and to cause the first memory to store the first correspondence information.

In response to an elapse of a predetermined second period longer than the first period, the controller may be configured or programmed to cause the first communicator to transmit, to the server, a plurality of pieces of the correspondence information generated and stored in the first memory in the second period.

The server may include an information manager to manage information stored in the second memory. In a case of a plurality of pieces of the correspondence information having been stored in the second memory in a chronological order based on the time information, the information manager may be configured or programmed to delete, among a plurality of pieces of the setting information arranged in a chronological order, a piece of the setting information including contents that are the same as contents of an immediately preceding piece of the setting information.

The server may include an information manager to manage information stored in the second memory. In a case of a plurality of pieces of the correspondence information having been stored in the second memory in a chronological order based on the time information, the information manager may be configured or programmed to delete, among a plurality of pieces of the setting information arranged in a chronological order, a piece of the setting information including contents that are the same as contents of another piece of the setting information within the same day.

The server may include an information manager to manage information stored in the second memory. In a case of a plurality of pieces of the first correspondence information having been stored in the second memory in a chronological order based on the time information, the information manager may be configured or programmed to perform, every predetermined third period longer than the first period and shorter than the second period, an operation of keeping only one of a plurality of pieces of the first correspondence information included in the third period and deleting others of the plurality of pieces of the first correspondence information included in the third period.

The server may include an information manager to manage information stored in the second memory. In a case of a plurality of pieces of the correspondence information having been stored in the second memory in a chronological order based on the time information, the information manager may be configured or programmed to keep a piece of the correspondence information of a piece of the setting information different from an immediately preceding piece of the setting information among a plurality of pieces of the setting information arranged in a chronological order, and may be configured or programmed to delete a piece of the correspondence information of a piece of the setting information that is the same as an immediately preceding piece of the setting information among the plurality of pieces of the setting information arranged in a chronological order.

The setting information may include at least one or more of pieces of information including the reference line indicating a travel direction of the working vehicle during automatic steering, a type of work during automatic steering, a width of work during automatic steering, an overlap width which is a width of an overlap of work ranges, a work route indicating a set route, a control gain which is a control parameter during automatic steering, and a setting status regarding setting of the reference line.

The working vehicle may include a registration switch to set the reference line when the manual steering is being performed. The controller may include, in the setting information, information on the reference line set by the registration switch.

In response to a request to transmit the setting information being received from the working vehicle, the server may be operable to transmit, by the second communicator, the setting information stored in the second memory to the working vehicle. In response to the steering changeover switch being instructed to start automatic steering, the automatic steering mechanism may be operable to perform automatic steering of the vehicle body based on the position of the vehicle body detected by the position detector and the setting information received by the first communicator. The working device may be operable to perform work based on the setting information received by the first communicator.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 8A is a diagram illustrating an example of correspondence information.

FIG. 8B is a diagram illustrating an example of first setting information.

FIG. 8C is a diagram illustrating an example of second setting information and third setting information.

FIG. 10A is a diagram illustrating an example of correspondence information generated by the working vehicle in a second period and transmitted to a server.

FIG. 10B is a diagram illustrating an example in which duplicate correspondence information is deleted and managed in the server.

FIG. 16 is a diagram illustrating an example of data in which an agricultural field, a working period, and setting information are associated with each another.

DETAILED DESCRIPTION OF THE PREFERRED EMBODIMENTS

Figure 1:
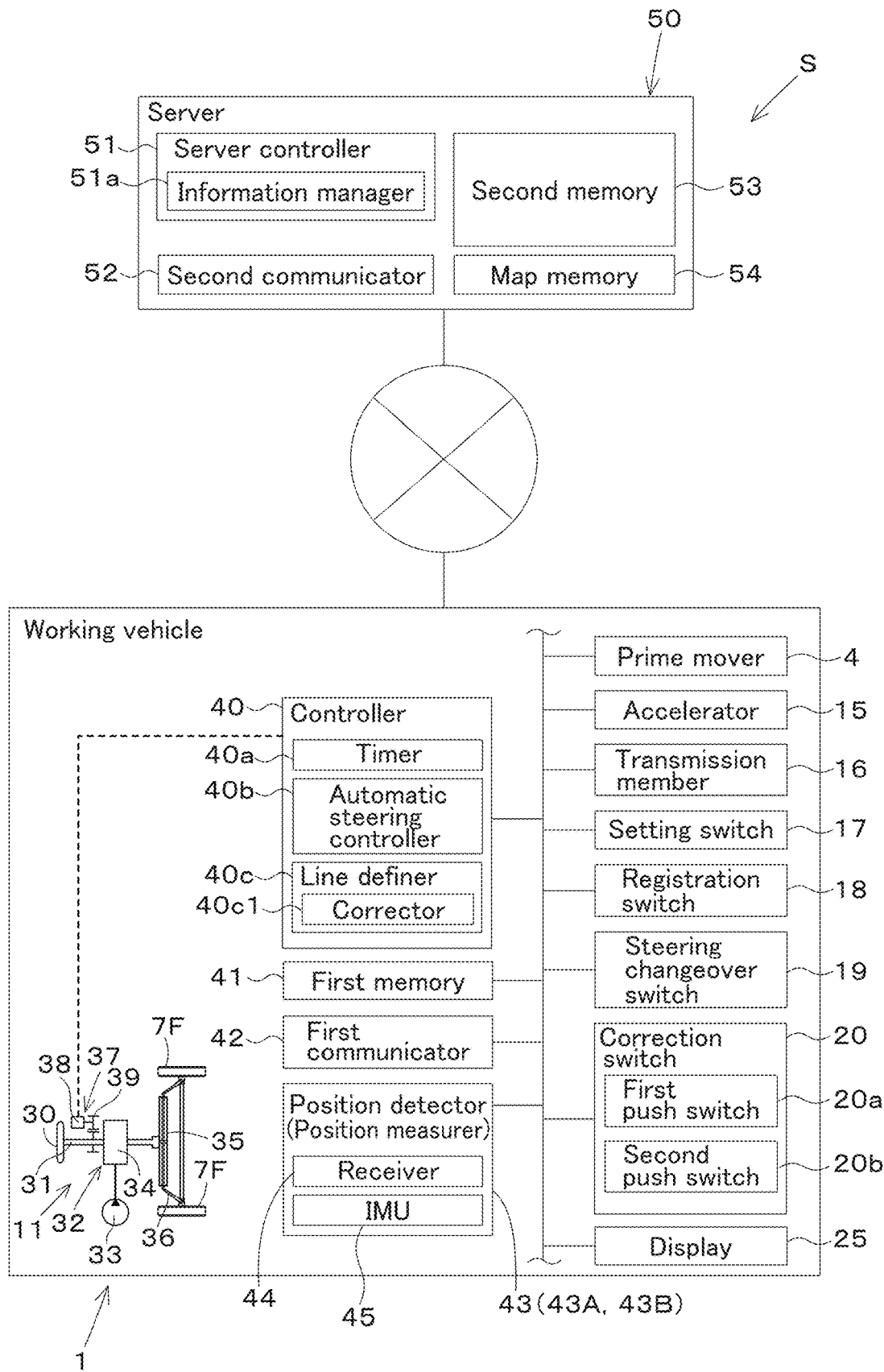
FIG. 1 is an overall view of a management system according to a first preferred embodiment of the present invention.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereinafter, preferred embodiments of the present invention will be described with reference to the drawings.

First Preferred Embodiment

FIG. 1 illustrates an overall view of a management system S according to a first preferred embodiment. As illustrated in FIG. 1, the management system S includes a working vehicle 1 and a server 50. The working vehicle 1 is capable of communicating with the server 50. In the management system S according to the first preferred embodiment, correspondence information RD including setting information SI of the working vehicle 1 to be automatically steered can be transmitted to the server 50, and the correspondence information RD can be stored and managed in the server 50.

Figure 17:
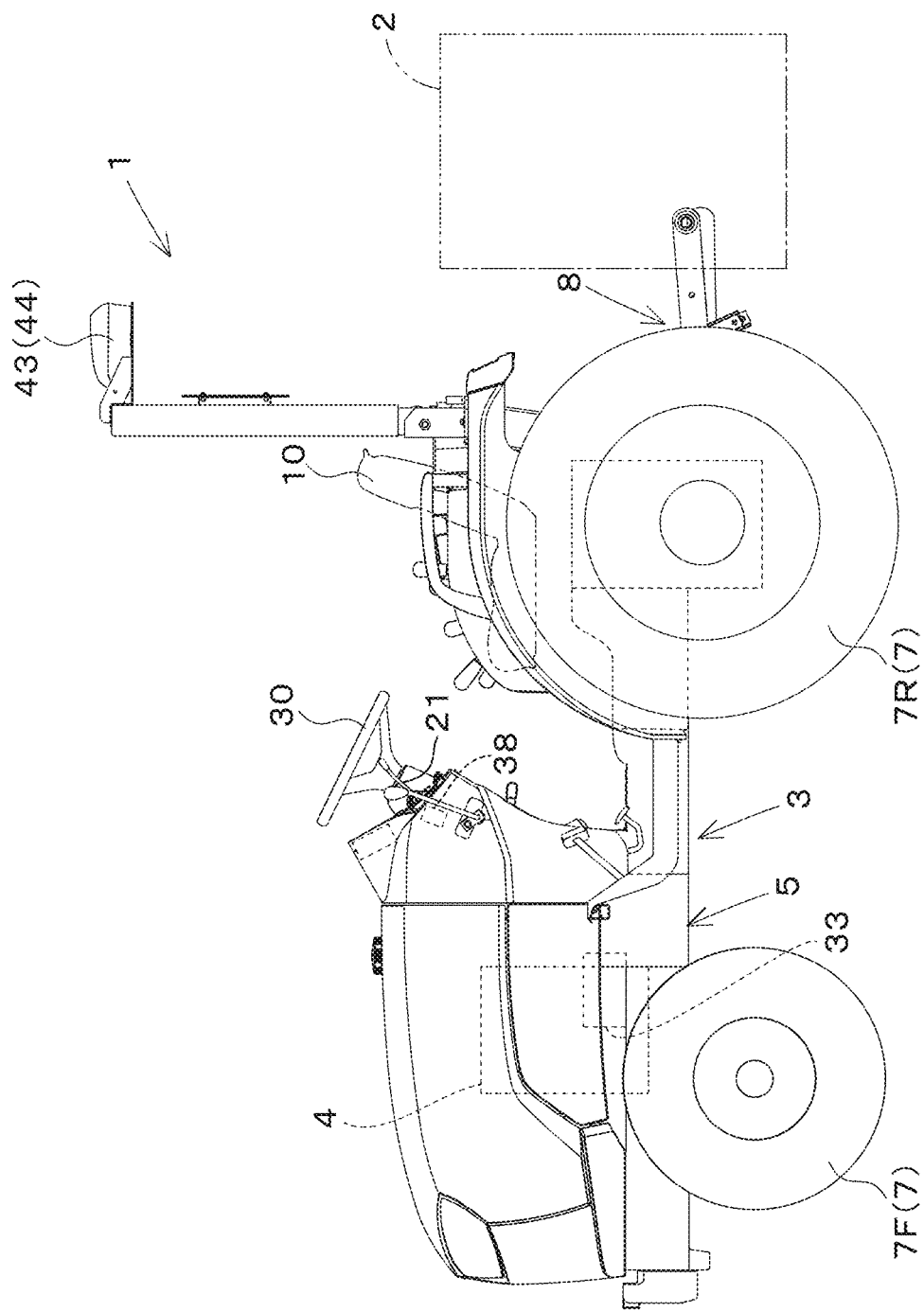
FIG. 17 is a side view of a tractor (working vehicle).

First, the working vehicle 1 will be described with reference to FIG. 17. FIG. 17 is a side view of the working vehicle 1. As illustrated in FIG. 17, in the present preferred embodiment, the working vehicle 1 is a tractor. The working vehicle 1 is not limited to a tractor, and may be an agricultural machine (agricultural vehicle) such as a combine or a transplanter, or may be a construction machine (construction vehicle) such as a loader working machine.

As illustrated in FIG. 17, the working vehicle 1 includes a vehicle body 3, a prime mover 4, and a transmission 5. The vehicle body 3 includes a traveling device 7 and is capable of traveling by the traveling device 7. The vehicle body 3 is capable of traveling by either automatic steering based on a reference line L1 or manual steering.

The traveling device 7 includes a pair of front wheels 7F, and a pair of rear wheels 7R, which are of a tire type in the example illustrated in FIG. 17 and may be of a crawler type.

The prime mover 4 is a diesel engine in the present preferred embodiment, but may be an electric motor or the like. The transmission 5 is capable of switching the propelling force of the traveling device 7 by switching the speed stage, and is capable of switching between forward travel and reverse travel of the traveling device 7. As illustrated in FIG. 17, the vehicle body 3 includes an operator's seat 10 on which an operator is to be seated.

In the description of the present preferred embodiment, a direction in which an operator seated on the operator's seat 10 of the working vehicle 1 is oriented (the left side of FIG. 17) is referred to as a forward direction, and the opposite direction thereof (the right side of FIG. 17) is referred to as a rearward direction. A leftward direction of the operator (the near side of FIG. 17) is referred to as a leftward direction, and a rightward direction of the operator (the far side of FIG. 17) is referred to as a rightward direction. A direction orthogonal to a front-rear direction of the vehicle body 3 may be referred to as a machine-body-width direction (width direction).

A coupler 8 including a three-point linkage or the like is provided in a rear portion of the vehicle body 3. A working device 2 (for example, an implement) can be attached to and detached from the coupler 8. When the working device 2 is coupled to the coupler 8 and the traveling device 7 is driven, the working vehicle 1 is capable of pulling the coupled working device 2. The working device 2 is a cultivator that performs cultivation, a fertilizer spreader that spreads fertilizer, an agricultural chemical spreader that spreads agricultural chemicals, a harvester that performs harvesting, a mower that mows grass or the like, a tedder that spreads grass or the like, a rake that gathers grass or the like, a baler that forms grass or the like into a bale, or the like.

The working device 2 is not limited to the above-described examples as long as the working device 2 is capable of being coupled to the coupler 8 of the working vehicle 1 or being provided in the working vehicle 1 and performing work. For example, in a case where the working vehicle 1 is a combine, the working device 2 includes a reaper that reaps crops or the like, and a thresher that threshes crops. In a case where the working vehicle 1 is a rice transplanter, the working device 2 includes a planter that plants seedlings.

As illustrated in FIG. 1, the working vehicle 1 includes a controller 40 and a first memory 41. The controller 40 controls, for example, a traveling system and a working system of the working vehicle 1. The controller 40 includes electric and electronic components, a program, and so forth. The controller 40 includes a timer 40a that measures (clocks) time. The timer 40a is, for example, a real-time clock, and measures time (Christian Era year, date, and time).

The first memory 41 is a nonvolatile memory or the like, and is capable of storing various programs or the like and various pieces of information regarding the working vehicle 1. For example, the controller 40 is capable of causing the first memory 41 to store the time measured by the timer 40a and other information in association with each other.

An accelerator (accelerator pedal, accelerator lever) 15 and a transmission member (transmission lever, transmission switch) 16, provided in the vehicle body 3, are connected to the controller 40. The accelerator 15 is to be used by an operator to manually operate the travel speed of the working vehicle 1 (vehicle body 3), that is, the vehicle speed. The controller 40 controls the travel speed of the vehicle body 3 in response to an operation signal output from the accelerator 15. Specifically, the controller 40 controls the travel speed of the vehicle body 3 based on the amount by which the accelerator 15 is operated and a control map stored in advance in the first memory 41.

The transmission member 16 is to be used by an operator to manually operate the speed stage of the transmission 5. The controller 40 changes the speed stage of the transmission 5 in response to an operation signal output from the transmission member 16. In the present preferred embodiment, the controller 40 changes the speed stage of the transmission 5 in response to an operation of the transmission member 16. Alternatively, the transmission member 16 may be configured to directly change the speed stage of the transmission 5 without the intervention of the controller 40.

As illustrated in FIG. 1, the working vehicle 1 includes a first communicator 42. The first communicator 42 is capable of communicating with the server 50. The first communicator 42 performs, for example, wireless communication using a data communication network, a mobile phone communication network, or the like. The first communicator 42 is a communication module that performs either direct communication or indirect communication with the servers 50, and may perform, for example, wireless communication using Bluetooth (registered trademark) Low Energy in the specifications of Bluetooth (registered trademark) of the communication standard IEEE 802.15.1 series, WiFi (registered trademark) of the communication standard IEEE 802.11.n series, or the like.

As illustrated in FIG. 1, the working vehicle 1 includes a position detector (position measurer) 43. The position detector 43 is capable of detecting its own position information (measured position information including latitude and longitude) by a satellite positioning system (positioning satellites), such as D-GPS, GPS, GLONASS, BeiDou, Galileo, or Michibiki. That is, the position detector 43 receives satellite signals transmitted from the positioning satellites (the positions of the positioning satellites, transmission times, etc.), and detects position information (for example, latitude and longitude) based on the satellite signals. The position detector 43 includes a receiver 44 and an inertial measurement unit (IMU) 45. The receiver 44 includes an antenna or the like, receives satellite signals transmitted by the positioning satellites, and is attached to the vehicle body 3 separately from the IMU 45. In the present preferred embodiment, the receiver 44 is attached to a roll-over protective structure (ROPS) provided in the vehicle body 3. The location to which the receiver 44 is attached is not limited to the ROPS as long as the receiver 44 is capable of receiving satellite signals transmitted by the positioning satellites.

The IMU 45 includes an acceleration sensor that detects an acceleration, and a gyroscope sensor that detects an angular velocity. The IMU 45 is provided in the vehicle body 3, for example, below the operator's seat 10, and is capable of detecting a roll angle, a pitch angle, a yaw angle, and the like of the vehicle body 3.

As illustrated in FIG. 1, the working vehicle 1 includes a steering device 11. The steering device 11 is capable of performing manual steering, in which the vehicle body 3 is steered by an operation by an operator, and automatic steering, in which the vehicle body 3 is automatically steered without an operation by an operator.

The steering device 11 includes a steering wheel 30 and a steering shaft (rotation shaft) 31 that rotatably supports the steering wheel 30. The steering device 11 also includes an assist mechanism (power steering device) 32. The assist mechanism 32 assists the rotation of the steering shaft 31 (steering wheel 30) using a hydraulic pressure or the like. The assist mechanism 32 includes a hydraulic pump 33, a control valve 34 to which a hydraulic fluid delivered from the hydraulic pump 33 is supplied, and a steering cylinder 35 activated by the control valve 34. The control valve 34 is, for example, a three-position switching valve that is switchable by a movement of a spool or the like, and is switched in accordance with a steering direction (rotation direction) of the steering shaft 31. The steering cylinder 35 is connected to arms (knuckle arms) 36 that change the orientation of the front wheels 7F.

Thus, upon the steering wheel 30 being operated in a first direction or a second direction opposite to the first direction, with the steering wheel 30 being grasped by an operator, the switching position and the opening of the control valve 34 are switched in accordance with the rotation direction of the steering wheel 30. Accordingly, the steering cylinder 35 is extended or contracted to the left or right in accordance with the switching position and the opening of the control valve 34, and thus the steering direction of the front wheels 7F can be changed. That is, the travel direction of the vehicle body 3 can be changed to the left or right by manual steering of the steering wheel 30.

As illustrated in FIG. 1, the steering device 11 includes an automatic steering mechanism 37. The automatic steering mechanism 37 performs automatic steering of the vehicle body 3, and automatically steers the vehicle body 3 based on the position of the vehicle body 3 (vehicle body position P) detected by the position detector 43. The automatic steering mechanism 37 includes a steering motor 38 and a gear mechanism 39. The steering motor 38 is a motor whose rotation direction, rotation speed, rotation angle, and so forth can be controlled based on the vehicle body position P. The gear mechanism 39 includes a gear that is provided on the steering shaft 31 and rotates together with the steering shaft 31, and a gear that is provided on a drive shaft of the steering motor 38 and rotates together with the drive shaft. When the drive shaft of the steering motor 38 rotates, the steering shaft 31 automatically rotates (turns) via the gear mechanism 39, and the steering direction of the front wheels 7F can be changed such that the vehicle body position P coincides with a scheduled travel line L2.

In the present preferred embodiment, the working vehicle 1 includes the steering device 11 including the steering wheel 30, and the steering device 11 changes the orientation of the front wheels 7F to change the steering direction, but the present invention is not limited thereto. The mechanism to change the travel direction is not limited to the above-described mechanism as long as the steering direction (travel direction) of the vehicle body 3 can be changed by manual steering and automatic steering.

Next, the control of automatic steering of the vehicle body 3 will be described. The working vehicle 1 is capable of acquiring a predetermined reference line L1 and performing automatic steering based on a scheduled travel line L2 parallel to the reference line L1. In automatic steering, the automatic steering mechanism 37 automatically steers the working vehicle 1 (vehicle body 3) in a travel direction such that the vehicle body position P detected by the position detector 43 coincides with the scheduled travel line L2.

As illustrated in FIG. 1, the controller 40 includes an automatic steering controller 40*b*. The automatic steering controller 40*b* is provided in the controller 40, and includes electric and electronic components provided in the controller 40, a program installed in the first memory 41, and so forth.

Figure 2A:
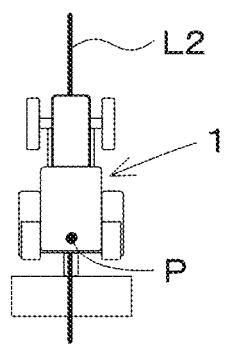
FIG. 2A is a diagram for describing automatic steering.

As illustrated in FIG. 2A, the automatic steering controller 40*b* controls the steering motor 38 of the automatic steering mechanism 37 such that the vehicle body 3 travels along the scheduled travel line L2. When the automatic steering controller 40*b* is performing automatic steering, the operator is capable of changing the travel speed of the vehicle body 3 and the speed stage of the transmission 5 by operating the accelerator 15 and the transmission member 16.

Hereinafter, the control of the automatic steering mechanism 37 performed by the automatic steering controller 40*b* will be described in detail. As illustrated in FIG. 2A, when the deviation of the vehicle body position P from the scheduled travel line L2 is smaller than a predetermined value, the automatic steering controller 40*b* maintains the rotation angle of the rotation shaft of the steering motor 38.

Figure 2B:
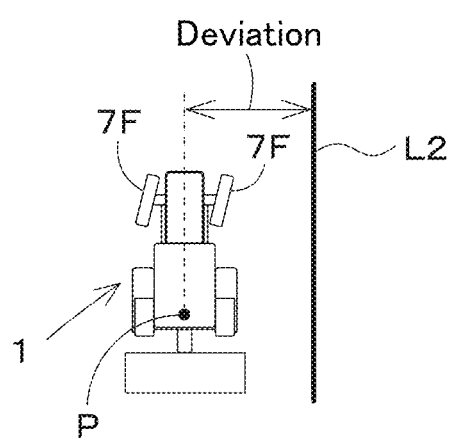
FIG. 2B is a diagram for describing automatic steering.

As illustrated in FIG. 2B, when the deviation (positional deviation) of the vehicle body position P from the scheduled travel line L2 is greater than or equal to the predetermined value and the working vehicle 1 is located to the left of the scheduled travel line L2, the automatic steering controller 40*b* rotates the rotation shaft of the steering motor 38 such that the working vehicle 1 is steered rightward. That is, when the deviation (positional deviation) of the vehicle body position P from the scheduled travel line L2 is greater than or equal to the predetermined value and the working vehicle 1 is located to the left of the scheduled travel line L2, the automatic steering controller 40*b* changes the steering angle such that the positional deviation becomes zero, and steers the front wheels 7F rightward.

Figure 2C:
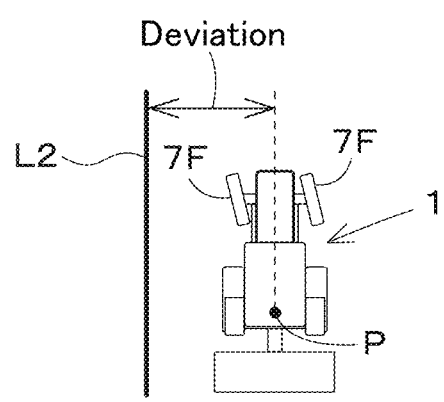
FIG. 2C is a diagram for describing automatic steering.

As illustrated in FIG. 2C, when the deviation of the vehicle body position P from the scheduled travel line L2 is greater than or equal to the predetermined value and the working vehicle 1 is located to the right of the scheduled travel line L2, the automatic steering controller 40*b* rotates the rotation shaft of the steering motor 38 such that the working vehicle 1 is steered leftward. That is, when the deviation of the vehicle body position P from the scheduled travel line L2 is greater than or equal to the predetermined value and the working vehicle 1 is located to the right of the scheduled travel line L2, the automatic steering controller 40b changes the steering angle such that the positional deviation becomes zero, and steers the front wheels 7F leftward.

Figure 2D:
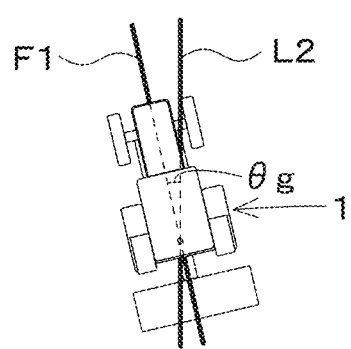
FIG. 2D is a diagram for describing automatic steering.

In FIGS. 2A to 2C referred to above, the steering angle of the steering device 11 is changed based on the deviation of the vehicle body position P from the scheduled travel line L2. In contrast, as illustrated in FIG. 2D, when an azimuth (vehicle body azimuth) F1 of the travel direction of the working vehicle 1 (vehicle body 3) is different from the azimuth of the scheduled travel line L2, that is, when an angle θg of the vehicle body azimuth F1 with respect to the scheduled travel line L2 is greater than or equal to a predetermined value, the automatic steering controller 40b may define a steering angle such that the angle θg is zero (the vehicle body azimuth F1 coincides with the azimuth of the scheduled travel line L2). The automatic steering controller 40b may define a final steering angle in automatic steering based on the steering angle calculated from the deviation (positional deviation) and the steering angle calculated from the azimuth (azimuth deviation). The method for defining the steering angle of automatic steering is not limited to the above-described example as long as the automatic steering controller 40b is capable of defining the steering angle of automatic steering.

The working vehicle 1 includes a display 25. The display 25 is, for example, a liquid crystal display panel, an organic electroluminescence (EL) panel, or the like. The display is connected to the controller 40 and is capable of performing display regarding the working vehicle 1 and display regarding the working device 2. The display 25 may have a touch screen function. For example, the display 25 includes a display screen, such as a touch display that enables an input operation, and outputs information input thereto (information regarding automatic steering of the working vehicle 1, work information of the working device 2, etc.) to the controller 40. As described above, the display 25 may include an input device (input interface). In this case, the display 25 is capable of receiving various pieces of information input by the operator. The controller 40 is capable of storing, in the first memory 41, information output from the display 25 (input device) (information regarding automatic steering of the working vehicle 1, work information of the working device 2, etc.).

As illustrated in FIG. 1, the working vehicle 1 includes a setting switch 17. The setting switch 17 is connected to the controller 40. The setting switch 17 is a switch to switch to a setting mode of performing at least setting before start of automatic steering. The setting mode is a mode of performing various settings regarding automatic steering before start of the automatic steering, and is, for example, a mode of setting a start point and an end point of a reference line L1. In addition, the setting mode is a mode in which automatic steering based on a scheduled travel line L2 is possible after the reference line L1 has been set.

The setting switch 17 is switchable between ON and OFF. In an ON state, the setting switch 17 outputs a signal indicating that the setting mode is enabled to the controller 40. In an OFF state, the setting switch 17 outputs a signal indicating that the setting mode is disabled to the controller 40. In an ON state, the setting switch 17 outputs a signal indicating that the setting mode is enabled to the display 25, which will be described below. In an OFF state, the setting switch 17 outputs a signal indicating that the setting mode is disabled to the display 25.

Figure 3:
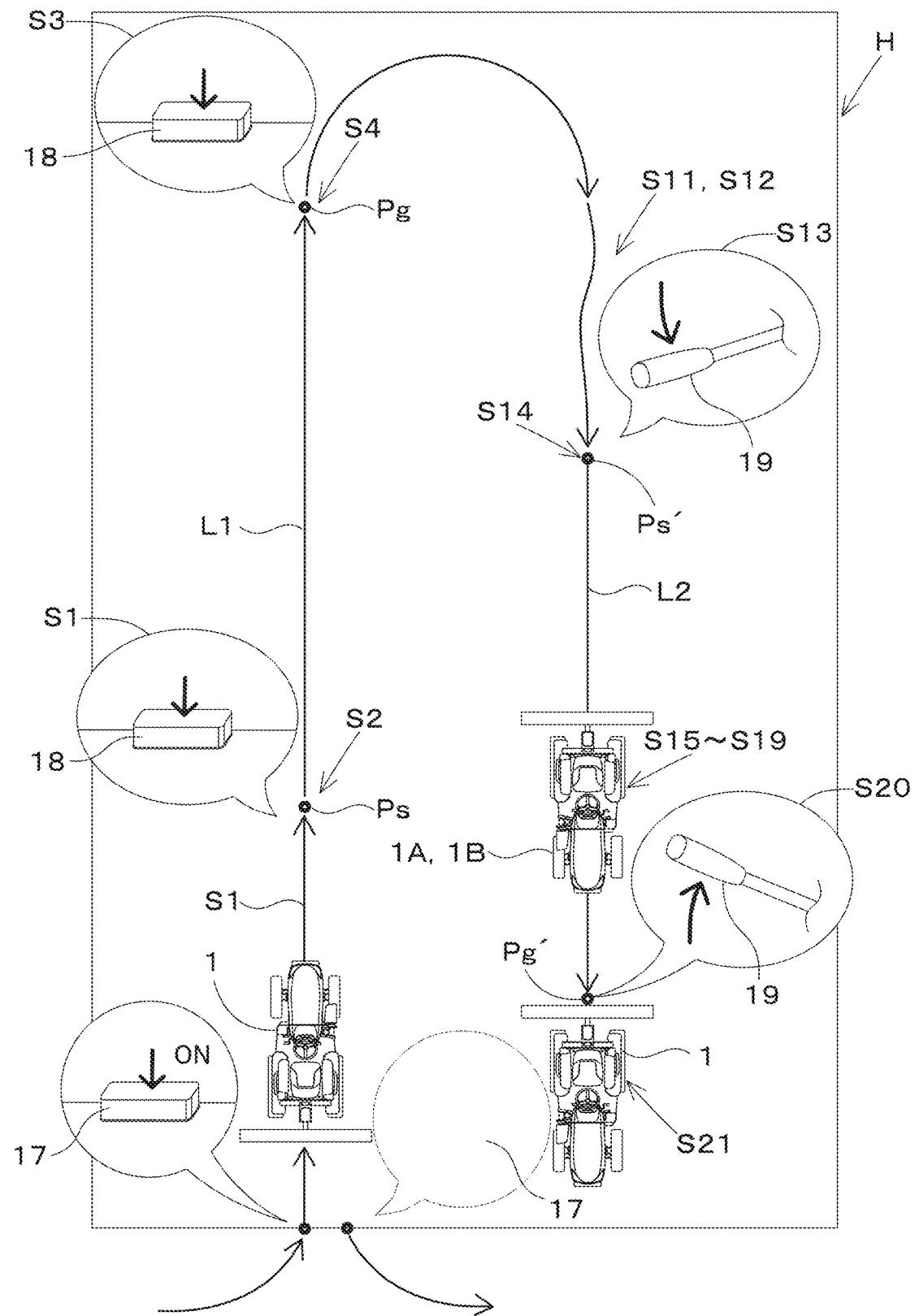
FIG. 3 is a diagram illustrating an example in which a line definer defines a reference line and a scheduled travel line.

FIG. 3 is a diagram illustrating an example in which a line definer 40c defines a reference line L1 and a scheduled travel line L2. As illustrated in FIG. 3, the operator basically turns ON the setting switch 17 when causing the working vehicle 1 to enter an agricultural field H (field) (for example, immediately before entry, at the time of entry, or after entry). The operator turns OFF the setting switch 17 when causing the working vehicle 1 to exit the agricultural field H (for example, before exit, at the time of exit, or immediately after exit).

As illustrated in FIG. 1, the working vehicle 1 includes a steering changeover switch 19. The steering changeover switch 19 is a switch that can be operated to start (set) or end (cancel) automatic steering. In the present preferred embodiment, the steering changeover switch 19 is a lever switch that can be pivotally operated as illustrated in FIG. 3. The steering changeover switch 19 is connected to the controller 40 and is capable of outputting an operation signal to the controller 40.

When the setting switch 17 is ON (in the setting mode), the automatic steering controller 40b starts or ends automatic steering in response to an operation of the steering changeover switch 19. In other words, when the setting switch 17 is OFF (not in the setting mode), the automatic steering controller 40b does not start automatic steering even if the steering changeover switch 19 is operated. Specifically, in response to the steering changeover switch 19 being operated after the setting switch 17 has been turned ON by the operator (third operation), the automatic steering controller 40b starts automatic steering of the working vehicle 1. In response to the steering changeover switch 19 being operated during automatic steering of the working vehicle 1 (fourth operation), the automatic steering controller 40b ends the automatic steering of the working vehicle 1. The steering changeover switch 19 and a registration switch 18, which will be described below, may be configured to be operated by a common operation member 21 illustrated in FIG. 17, and the configuration thereof is not limited to the above-described configuration.

FIG. 8A is a diagram illustrating an example of correspondence information RD. The controller 40 generates correspondence information RD in which time information TI measured by the timer 40a and at least one of position information PI (for example, latitude and longitude) of the vehicle body 3 detected by the position detector 43 or setting information SI of the working vehicle 1 are associated with each other, and causes the first memory 41 to store the correspondence information RD. The setting information SI of the working vehicle 1 includes first setting information (main information), second setting information (flag information), and third setting information (status information).

FIG. 8B is a diagram illustrating an example of first setting information. As illustrated in FIG. 8B, the first setting information includes various pieces of data D1 to D7. The data D1 indicates a reference line L1 or a reference line azimuth indicating the travel direction of the vehicle during automatic steering. The data D2 indicates the type of work (for example, rotary, ridging, wet tillage, etc.) during automatic steering. The data D3 indicates the width of work (for example, a ridge width) during automatic steering. A ridge width is the width of a ridge to be formed, and is set at the time of ridging. The data D4 indicates an overlap width (overlapped dimension), which is the width of an overlap of work ranges, the number of ridges, and so forth. The number of ridges is the number of ridges to be formed, and is set at the time of ridging. The data D5 indicates a work route indicating a route that has been set (for example, the type of route, turn to an adjacent line, turn by skipping one line, etc.). The data D6 indicates adjustment of sensitivity of control (for example, a control gain which is a control parameter) during automatic steering. The data D7 indicates a setting status regarding the setting of a reference line L1. For example, the setting status indicates a method of setting a reference line L1 or a reference line azimuth, such as acquiring of a start point and an end point and calculating of a reference line L1 or a reference line azimuth, or download from the server 50.

FIG. 8C is a diagram illustrating an example of second setting information and third setting information. The second setting information includes a setting mode flag FL1, a start point flag FL2, an end point flag FL3, and a straight-ahead-travel assist flag FL4. The setting mode flag FL1 is a value indicating a state in which an operation related to automatic steering is possible. The setting mode flag FL1 is turned ON in response to the setting switch 17 being turned ON (in the setting mode), and is turned OFF in response to the setting switch 17 being turned OFF (not in the setting mode). The start point flag FL2 is a flag indicating that a start point Ps has been acquired. The start point flag FL2 is turned ON in response to the start point Ps of the reference line L1 being set, and is turned OFF in response to the start point Ps of the reference line L1 not being set. The end point flag FL3 is a flag indicating that an end point Pg has been acquired. The end point flag FL3 is turned ON in response to the end point Pg of the reference line L1 being set, and is turned OFF in response to the end point Pg of the reference line L1 not being set. The straight-ahead-travel assist flag FL4 is a flag indicating that automatic steering is being performed. When the setting mode flag FL1 is ON, the straight-ahead-travel assist flag FL4 is turned ON in response to a third operation being performed on the steering changeover switch 19, and is turned OFF in response to a fourth operation being performed on the steering changeover switch 19. The third setting information includes data D8. The data D8 indicates, for example, a positioning status, such as single positioning or relative positioning. The latitude PY and the longitude PX illustrated in FIG. 8C are position information PI, and are information indicating a latitude and information indicating a longitude, respectively.

The controller 40 causes the first communicator 42 to transmit the correspondence information RD stored in the first memory 41 to the server 50.

Now, a description will be given of generation and storage of correspondence information RD in the working vehicle 1. The correspondence information RD includes contents that vary depending on a plurality of generation conditions, and is generated at various timings. The controller 40 generates correspondence information RD including contents that vary depending on a plurality of generation conditions (for example, first correspondence information 1RD, second correspondence information 2RD, third correspondence information 3RD, and the like). The plurality of generation conditions include, for example, first to third generation conditions. The first to third generation conditions are conditions for generating the first correspondence information 1RD, the second correspondence information 2RD, and the third correspondence information 3RD, respectively.

Referring to FIG. 8A, in response to the first generation condition being satisfied (for example, every time a predetermined first period (for example, 6 seconds) elapses), the controller 40 generates, as correspondence information RD, first correspondence information 1RD in which the time information TI measured by the timer 40a and the position information PI of the vehicle body 3 detected by the position detector 43 are associated with each other, and causes the first memory 41 to store the first correspondence information 1RD. That is, the controller 40 generates correspondence information RD (first correspondence information 1RD in which the time information TI and the position information PI are associated with each other) and causes the first memory 41 to store the correspondence information RD, every time the first period (for example, about 6 seconds) elapses regardless of whether the setting mode is ON or OFF.

In response to the second generation condition being satisfied (for example, in response to the setting mode flag FL1 of the second setting information being changed), the controller 40 generates, as correspondence information RD, second correspondence information 2RD in which the time information TI and the setting mode flag FL1 of the second setting information in the setting information SI of the working vehicle 1 are associated with each other, and causes the first memory 41 to store the second correspondence information 2RD. That is, in response to an instruction to change the setting mode being provided, the controller 40 generates correspondence information RD (second correspondence information 2RD in which the time information TI and the setting mode flag FL1 are associated with each other) and causes the first memory 41 to store the correspondence information RD.

In response to the third generation condition being satisfied (for example, in response to the straight-ahead-travel assist flag FL4 of the second setting information being changed), the controller 40 generates, as correspondence information RD, third correspondence information 3RD in which the time information TI, the straight-ahead-travel assist flag FL4 of the second setting information in the setting information SI of the working vehicle 1, and the first setting information in the setting information SI of the working vehicle 1 are associated with each other, and causes the first memory 41 to store the third correspondence information 3RD. That is, in response to automatic steering being started or ended, the controller 40 generates correspondence information RD (third correspondence information 3RD in which the time information TI, the straight-ahead-travel assist flag FL4, and the first setting information are associated with each other) and causes the first memory 41 to store the correspondence information RD.

In response to an instruction to change the first setting information in the setting information SI of the working vehicle 1 being provided, the controller 40 generates correspondence information RD (i.e., correspondence information RD in which the time information TI and the first setting information are associated with each other) and causes the first memory 41 to store the correspondence information RD.

In response to an instruction to change the start point flag FL2 or the end point flag FL3 of the second setting information in the setting information SI of the working vehicle 1 being provided (in response to the registration switch 18 being operated), the controller 40 generates correspondence information RD (i.e., correspondence information RD in which the time information TI, the position information PI, and the start point flag FL2 or the end point flag FL3 of the second setting information are associated with each other) and causes the first memory 41 to store the correspondence information RD.

Next, a description will be given of a timing at which the working vehicle 1 transmits correspondence information RD to the server 50. Every time a predetermined second period (for example, about 10 minutes) longer than the first period (for example, about 6 seconds) elapses, the controller 40 causes the first communicator 42 to transmit, to the server 50, a plurality of pieces of correspondence information RD generated and stored in the first memory 41 in the second period. That is, in the second period (for example, about 10 minutes), one piece of first correspondence information 1RD is generated every first period (for example, about 6 seconds), and second correspondence information 2RD and third correspondence information 3RD are generated in response to the second generation condition and the third generation condition being satisfied. Thus, a plurality of (for example, 100 or more) pieces of correspondence information RD generated in the second period (for example, about 10 minutes) are transmitted to the server 50 at once immediately after the second period (for example, about 10 minutes) has elapsed. The controller 40 has a time measurement function (for example, software clock), and is capable of determining whether a period such as the first period or the second period has elapsed. As long as the first period is shorter than or equal to the second period, the first period and the second period may have values other than the above values (for example, about 6 seconds and about 10 minutes).

As illustrated in FIG. 1, the working vehicle 1 includes the line definer 40c. Specifically, the line definer 40c is provided in the controller 40, and includes electric and electronic components provided in the control device 40, a program installed in the first memory 41, and so forth. When the setting mode is ON, the line definer 40c defines a reference line L1 based on travel information of the vehicle body 3 when the vehicle body 3 is performing manual steering. The travel information of the vehicle body 3 is the position information PI detected by the position detector 43. In the present preferred embodiment, the travel information of the vehicle body 3 is the position information PI indicating the vehicle body position P. As illustrated in FIG. 3, the line definer 40c defines a predetermined start point Ps and a predetermined end point Pg when the vehicle body 3 is performing manual steering, thus defining the position information PI of a straight line passing through the start point Ps and the end point Pg as a reference line L1. The line definer 40c causes the first memory 41 to store the defined reference line L1.

When the travel information of the vehicle body 3 is the position information PI indicating the vehicle body position P, the position detector 43 only needs to detect at least the position information PI of the vehicle body 3 (vehicle body position P), and does not need to detect the azimuth of the vehicle body 3 (vehicle body azimuth F1). Hereinafter, for convenience of description, the position detector 43 capable of detecting at least the position information PI of the vehicle body 3 (vehicle body position P) may be referred to as a first position detector 43A.

In the present preferred embodiment, travel information is the position information PI indicating the vehicle body position P. Alternatively, travel information may be azimuth information indicating the azimuth of the vehicle body 3 (vehicle body azimuth F1). In this case, the line definer 40c defines, as the reference line L1, the azimuth indicated by a straight line passing through the start point Ps and the end point Pg. In other words, the line definer 40c defines the azimuth indicating the reference line L1.

When the travel information of the vehicle body 3 is azimuth information indicating the vehicle body azimuth F1, the position detector 43 only needs to detect at least the vehicle body azimuth F1 of the vehicle body 3, and does not need to detect the position information PI of the vehicle body 3. Hereinafter, for convenience of description, the position detector 43 capable of detecting at least the azimuth information of the vehicle body 3 (vehicle body azimuth F1) may be referred to as a second position detector 43B.

As illustrated in FIG. 1, the working vehicle 1 includes the registration switch 18. When the setting mode is ON, the line definer 40c acquires a start point Ps and an end point Pg of a reference line L1 in an agricultural field H, and defines the reference line L1 based on the acquired start point Ps and end point Pg.

The registration switch 18 is an operable switch operation actuator, and is, for example, a push button switch. The registration switch 18 is connected to the controller 40 and is capable of outputting an operation signal to the controller 40. The operator operates the registration switch 18 at the time of defining a reference line L1. The line definer 40c is capable of defining a start point Ps and an end point Pg in response to an operation of the registration switch 18.

Specifically, when the travel information is the position information PI, the line definer 40c defines a reference line L1 by acquiring a start point Ps and an end point Pg from the position of the working vehicle 1 (the vehicle body position P) when the registration switch 18 is operated, and registering the acquired start point Ps and end point Pg.

When the travel information is azimuth information, the line definer 40c acquires, for example, azimuth information or the like of the vehicle body 3 at the start point Ps and the end point Pg from the azimuth (azimuth information) of the working vehicle 1 when the registration switch 18 is operated. The line definer 40c calculates, for example, an average of the azimuth of the start point Ps and the azimuth of the end point Pg, and registers the azimuth of the reference line L1, thus defining the reference line L1.

Hereinafter, the relationship between the travel information acquired by the line definer 40c and an operation of the registration switch 18 will be described by using an example in which the travel information is the position information PI. Specifically, in response to the registration switch 18 being operated by the operator when the vehicle body 3 is manually steered (first operation), the line definer 40c defines the current vehicle body position P detected by the position detector 43 as a start point Ps of a reference line L1. In response to the registration switch 18 being operated by the operator after the first operation (second operation), the line definer 40c defines the current vehicle body position P detected by the position detector 43 as an end point Pg of the reference line L1.

Specifically, the line definer 40c causes the first memory 41 to store the time information TI indicating the time at which the first operation or the second operation is performed on the registration switch 18, the correspondence information RD including identification information indicating the start point Ps or the end point Pg (start point flag FL2 or end point flag FL3), and the vehicle body position P at the time at which the first operation or the second operation is performed, registers the start point Ps or the end point Pg, and defines the reference line L1. For example, the line definer 40c registers, in the first memory 41, the position information PI indicating the start point Ps and the end point Pg of the defined reference line L1.

In the preferred embodiment described above, the first memory 41 stores the position information PI indicating the start point Ps and the end point Pg of the reference line L1 as the reference line L1, but the present invention is not limited thereto. For example, the first memory 41 may store, as the reference line L1, data indicating the reference line L1 (azimuth or function). Even in the case of storing data indicating the reference line L1 (azimuth or function) or the like as the reference line L1, the first memory 41 stores the position information PI indicating the start point Ps and the end point Pg of the defined reference line L1.

Figure 4:
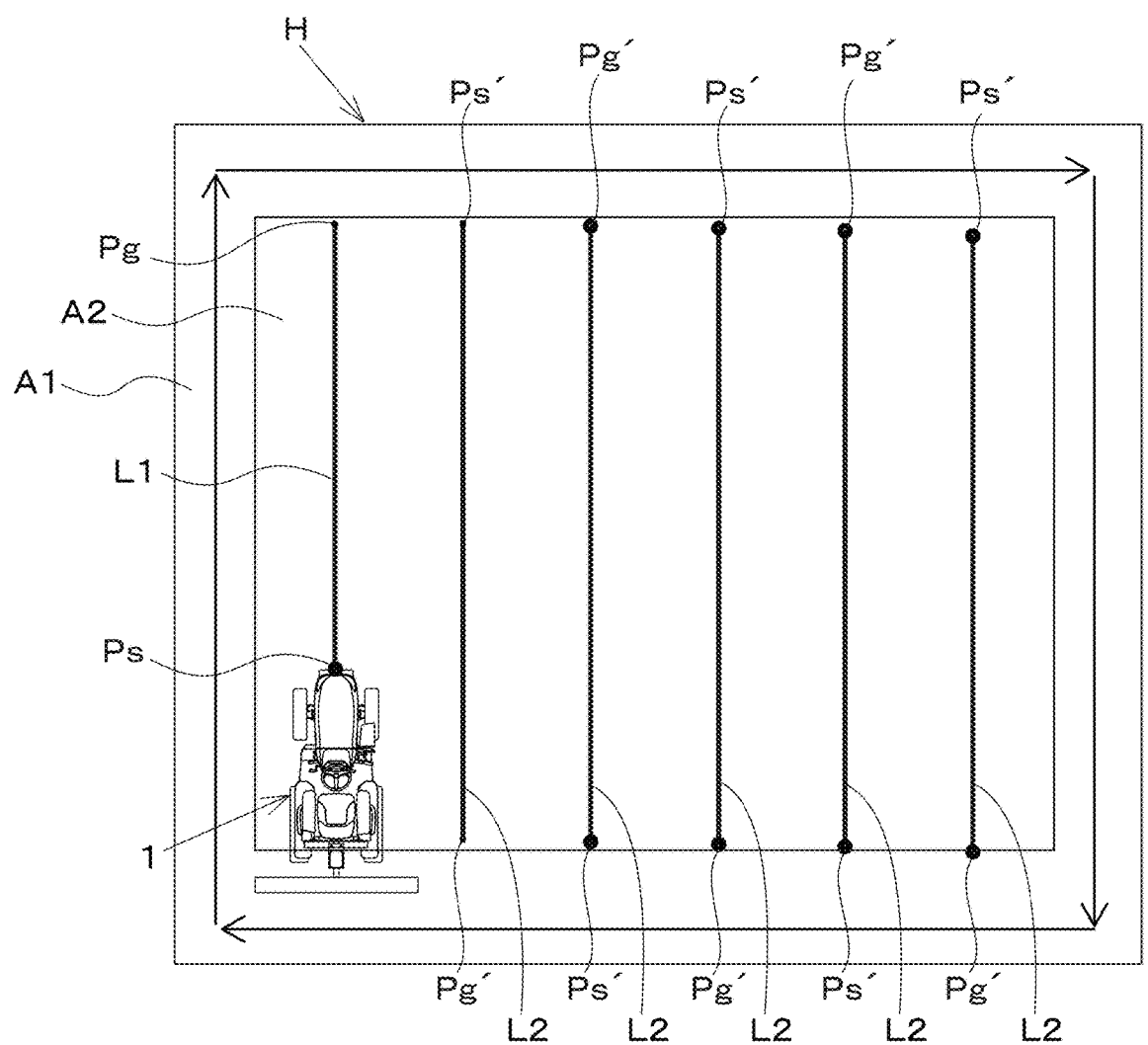
FIG. 4 is a diagram illustrating a reference line and scheduled travel lines.

As illustrated in FIG. 4, the line definer 40c is capable of defining, based on the reference line L1 stored in the first memory 41, scheduled travel lines L2 parallel to the reference line L1. The line definer 40c defines the scheduled travel lines L2 in accordance with an operation (third operation) of the steering changeover switch 19. First, a description will be given of, as an example, a case where the travel information is the position information PI and the reference line L1 is defined by the position information PI indicating the start point Ps and the end point Pg. In response to the steering changeover switch 19 being operated (third operation) by the operator with the reference line L1 being stored in the first memory 41, the line definer 40c acquires a current vehicle body position P at which the steering changeover switch 19 is operated. The line definer 40c shifts the reference line L1 in parallel based on a start point Ps', which is the current vehicle body position P, and the start point Ps of the reference line L1, thus defining a scheduled travel line L2. That is, a scheduled travel line L2 located at the start point Ps' is defined.

When the travel information is azimuth information or the like and the reference line L1 is defined by the azimuth of the reference line L1, the line definer 40c defines a scheduled travel line L2 indicating the same azimuth as the azimuth of the reference line L1 based on the azimuth of the reference line L1 with reference to the current vehicle body position P at which the steering changeover switch 19 is operated.

Now, a description will be given of the definition of a reference line L1 by the line definer 40c, with reference to FIG. 3, FIG. 4, and FIG. 5A. As illustrated in FIG. 3, the operator turns ON the setting switch 17 (i.e., the setting mode) at the time of causing the working vehicle 1 to enter the agricultural field H. At the time of defining a reference line L1, as illustrated in FIG. 4, the operator sets a headland area A1 by manually steering the working vehicle 1 (vehicle body 3) to turn along the inner side of the boundary of the agricultural field H (as indicated by arrows) before performing automatic steering, and sets the area on the inner side of the headland area A1 as a work area A2. Thereafter, as illustrated in FIG. 3, it is assumed that the operator moves the working vehicle 1 (vehicle body 3) to a certain position (start point Ps) from the vicinity of the headland in a predetermined third direction of the agricultural field H (the headland on the lower side of FIG. 3), and operates the registration switch 18.

Figure 5A:
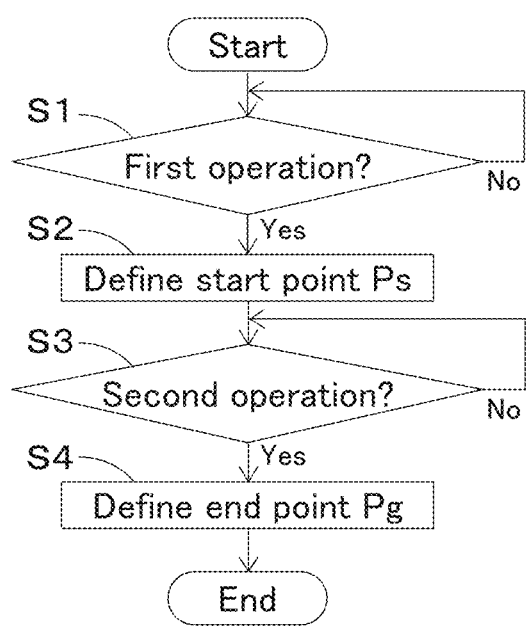
FIG. 5A is a flowchart illustrating a process of defining a reference line by performing manual steering.

As illustrated in FIG. 5A, the line definer 40c determines whether the registration switch 18 has been operated (first operation) (S1). Specifically, the line definer 40c determines whether a first operation has been performed, based on an operation signal output from the registration switch 18 to the controller 40.

When determining that the registration switch 18 has been operated (first operation) (Yes in S1), the line definer 40c defines the current vehicle body position P (position information PI) detected by the position detector 43, that is, the latest position information PI, as the start point Ps of the reference line L1 (S2). Specifically, the line definer 40c causes the first memory 41 to store correspondence information RD in which the time information TI indicating the time at which a first operation is performed on the registration switch 18, the identification information identifying the start point Ps (the start point flag FL2 is ON), and the vehicle body position P detected by the position detector 43 at the time at which the first operation is performed are associated with each other.

After operating the registration switch 18 (Yes in S1) and causing the line definer 40c to define the start point Ps (S2), the operator causes the working vehicle 1 to travel a predetermined distance by manual steering. Specifically, the operator moves the working vehicle 1 to, for example, the vicinity of a headland in a fourth direction opposite to the third direction of the agricultural field H (the headland on the upper side of FIG. 3).

After defining the start point Ps of the reference line L1 (S2), the line definer 40c determines whether the registration switch 18 has been operated (second operation) (S3). Specifically, the line definer 40c determines whether a second operation has been performed, based on an operation signal output from the registration switch 18 to the controller 40.

When determining that the registration switch 18 has been operated (second operation) (Yes in S3), the line definer 40c defines the current vehicle body position P (position information PI) detected by the position detector 43, that is, the latest position information PI, as the end point Pg of the reference line L1 (S4). Specifically, the line definer 40c causes the first memory 41 to store correspondence information RD in which the time information TI indicating the time at which a second operation is performed on the registration switch 18, the identification information identifying the end point Pg (the end point flag FL3 is ON), and the vehicle body position P detected by the position detector 43 at the time at which the second operation is performed are associated with each other. In addition, the line definer 40c registers, in the first memory 41, the position information PI indicating the start point Ps and the end point Pg of the defined reference line L1.

As a result of defining the start point Ps and the end point Pg of the reference line L1, the line definer 40c is capable of defining a straight line or azimuth connecting the start point Ps and the end point Pg as the reference line L1.

Next, a description will be given of a case where the automatic steering controller 40b changes the steering angle of the steering device 11 based on the deviation of the vehicle body position P from a scheduled travel line L2, with reference to FIG. 3 and FIG. 5B. After the line definer 40c has defined the reference line L1, the working vehicle 1 is automatically steered based on a scheduled travel line L2 parallel to the reference line L1. Before automatically steering the working vehicle 1, the operator moves the working vehicle 1 to a position (start point Ps') from which the working vehicle 1 is to be automatically steered.

Figure 5B:
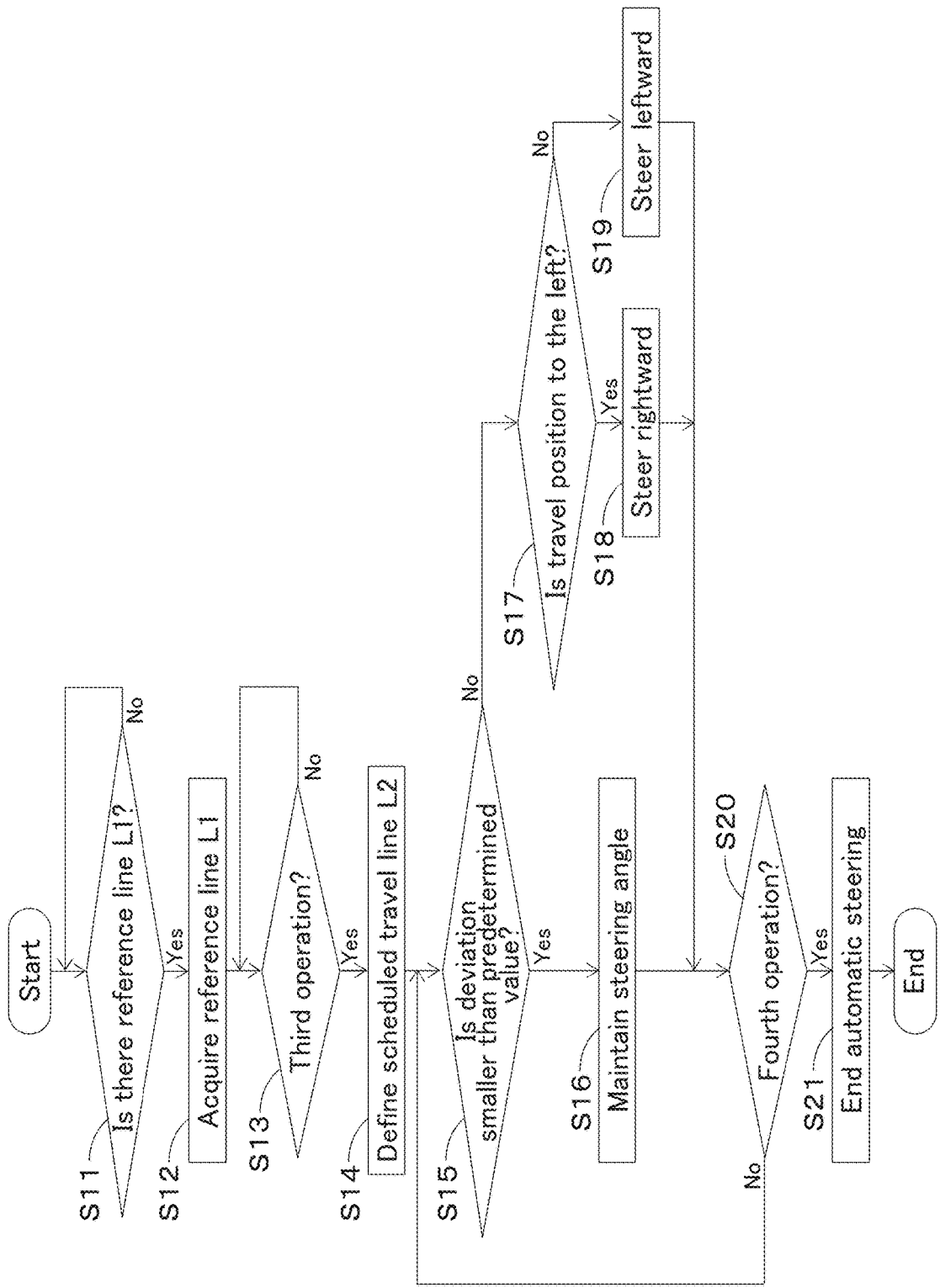
FIG. 5B is a flowchart illustrating a process of defining a scheduled travel line and performing automatic steering.

As illustrated in FIG. 5B, the line definer 40c determines whether the reference line L1 is stored in the first memory 41 (S11). When determining that the reference line L1 is stored in the first memory 41 (Yes in S11), the line definer 40c acquires the reference line L1 from the first memory 41 (S12). Specifically, the line definer 40c acquires, as the reference line L1, the position information PI of the straight line connecting the start point Ps and the end point Pg, or data indicating the reference line L1 (azimuth or function).

After acquiring the reference line L1 from the first memory 41 (S12), the line definer determines whether the steering changeover switch 19 has been operated (third operation) (S13). Specifically, the line definer 40c determines whether the steering changeover switch 19 has been operated (third operation), based on an operation signal output from the steering changeover switch 19 to the controller 40.

When determining that the steering changeover switch 19 has been operated (Yes in S13), the line definer 40c defines a scheduled travel line L2 (S14). Specifically, the line definer acquires, for example, the current vehicle body position P (position information PI), that is, the latest position information PI, as the start point Ps' of the scheduled travel line L2. The line definer 40c defines the scheduled travel line L2 that is obtained by shifting in parallel the start point Ps of the reference line L1 to the start point Ps', or the scheduled travel line L2 that is based on the current vehicle body position P and that indicates the same azimuth as the azimuth of the reference line L1. In addition, the line definer 40c holds the start point Ps' in the first memory 41.

After the line definer 40c has defined the scheduled travel line L2 (S14), the automatic steering controller 40b starts automatic steering and controls the automatic steering mechanism 37 such that the travel direction of the working vehicle 1 (vehicle body 3) is along the scheduled travel line L2. Specifically, when the travel information is the vehicle body position P (position information PI), the automatic steering controller 40b determines whether the deviation of the latest vehicle body position P detected by the position detector 43 from the scheduled travel line L2 is smaller than a predetermined value (S15).

When determining that the deviation of the latest vehicle body position P detected by the position detector 43 from the scheduled travel line L2 is smaller than the predetermined value (Yes in S15), the automatic steering controller 40b controls the automatic steering mechanism 37 to maintain the rotation angle of the rotation shaft of the steering motor 38 (S16).

When determining that the deviation of the latest vehicle body position P detected by the position detector 43 from the scheduled travel line L2 is greater than or equal to the predetermined value (No in S15), the automatic steering controller 40b determines whether the vehicle body position P is to the left of the scheduled travel line L2 (S17).

When determining that the vehicle body position P is to the left of the scheduled travel line L2 (Yes in S17), the automatic steering controller 40b controls the automatic steering mechanism 37 such that the working vehicle 1 is steered rightward, rotates the rotation shaft of the steering motor 38 to change the steering angle, and steers the front wheels 7F rightward (S18).

On the other hand, when determining that the vehicle body position P is not to the left of the scheduled travel line L2, that is, the vehicle body position P is to the right of the scheduled travel line L2 (No in S17), the automatic steering controller 40b controls the automatic steering mechanism 37 such that the working vehicle 1 is steered leftward, rotates the rotation shaft of the steering motor 38 to change the steering angle, and steers the front wheels 7F leftward (S19).

When the automatic steering controller 40b is performing automatic steering, the travel speed (vehicle speed) of the working vehicle 1 (vehicle body 3) is changed by the operator manually changing the amount by which the accelerator 15 (accelerator pedal, accelerator lever) is operated or operating the transmission member 16 (transmission lever, transmission switch).

After controlling the automatic steering mechanism 37 by automatic steering (S16, S18, or S19), the automatic steering controller 40b determines whether the steering changeover switch 19 has been operated (fourth operation) (S20). Specifically, the automatic steering controller 40b determines whether the steering changeover switch 19 has been operated (fourth operation), based on an operation signal output from the steering changeover switch 19 to the controller 40.

When determining that the steering changeover switch 19 has been operated (fourth operation) (Yes in S20), the automatic steering controller 40b ends the automatic steering (S21). Accordingly, the operator is capable of ending the automatic steering by operating the steering changeover switch 19 at any point in time, that is, at any position (end point Pg') after the automatic steering controller 40b starts the automatic steering. In other words, the scheduled travel line L2 defined by the line definer 40c does not have the end point Pg' defined in advance. The distance from the start point Ps' to the end point Pg' of the scheduled travel line L2 can be set to be longer than or shorter than the reference line L1. That is, the scheduled travel line L2 is not associated with the length of the reference line L1, and it is possible to cause the working vehicle 1 to travel a distance longer than the length of the reference line L1 by automatic steering along the scheduled travel line L2.

As illustrated in FIG. 1, the working vehicle 1 includes a correction switch 20, and the reference line L1 can be corrected based on an operation of the correction switch 20. The correction switch 20 is an operable operation actuator, and may be, for example, a pushable push switch or a slidable slide switch. The correction switch 20 is connected to the controller 40 so as to be capable of communicating with the controller 40, and is capable of outputting an operation signal to the controller 40.

The line definer 40c includes a corrector 40c1. The corrector 40c1 corrects and redefines the reference line L1 based on an operation of the correction switch 20, and corrects the steering of the vehicle body 3 during automatic steering. The corrector 40c1 includes electric and electronic components provided in the controller 40, a program installed in the first memory 41, and so forth.

In the present preferred embodiment, the corrector 40c1 corrects the scheduled travel line L2 and corrects the reference line L1, in accordance with an operation of the correction switch 20. For example, the corrector 40c1 corrects the scheduled travel line L2 and the reference line L1 stored in the first memory 41 by a correction amount h based on an operation of the correction switch 20.

Specifically, the corrector 40c1 defines the correction amount h based on the number of operations of the correction switch 20. The corrector 40c1 acquires the number of operations of the correction switch 20 based on operation signals output from the correction switch 20, and defines (calculates) the correction amount h. For example, the corrector 40c1 defines the correction amount h as the product of the number of operations and the correction amount h per operation.

That is, the corrector 40c1 increases the correction amount h (the degree of correction) in accordance with the number of operations of the correction switch 20. The correction amount h defined by the corrector 40c1 is proportional to the number of operations of the correction switch 20. For example, the correction amount h increases by several centimeters or several tens of centimeters every time the correction switch 20 is operated.

Figure 7:
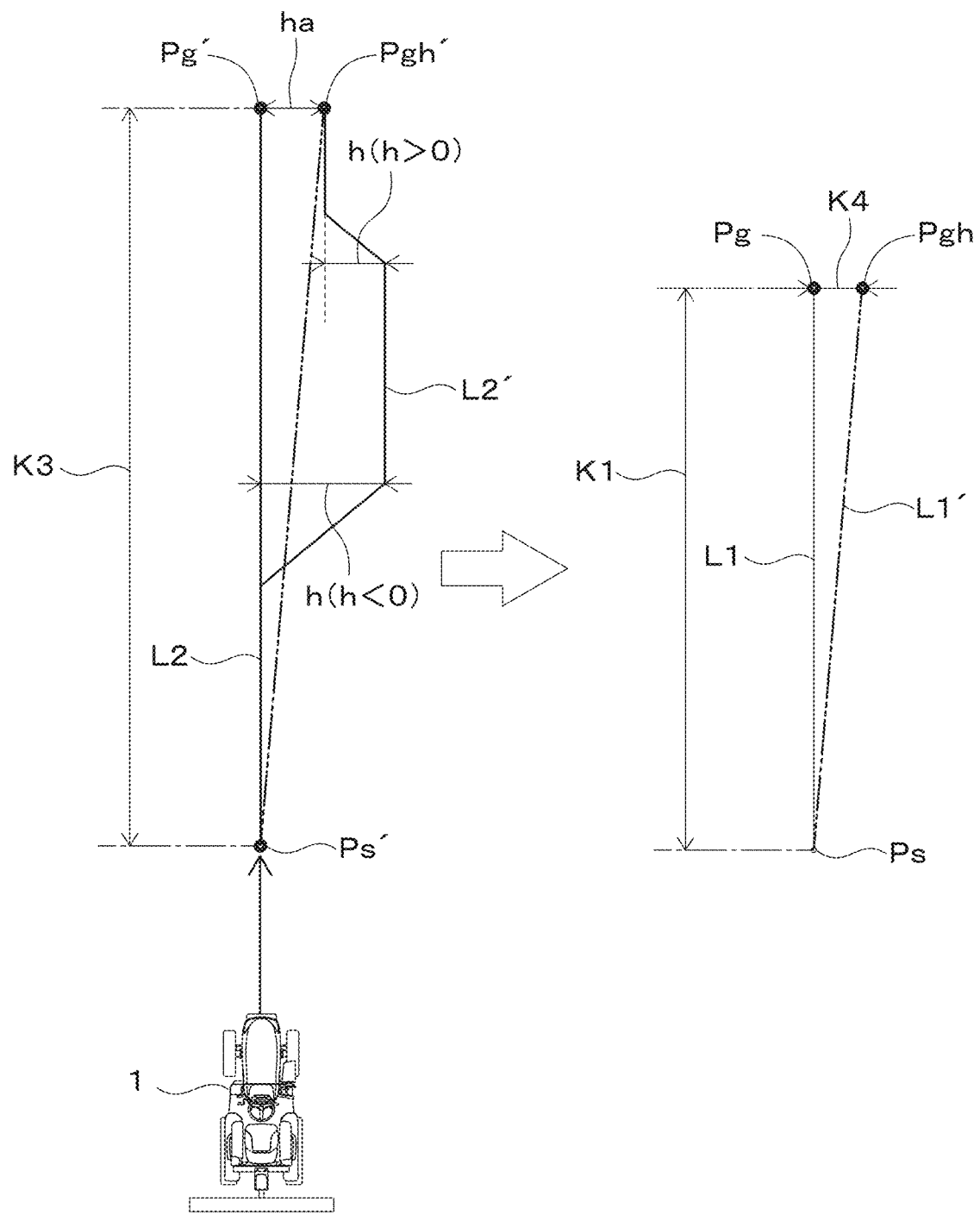
FIG. 7 is a diagram for describing correction of a scheduled travel line and a reference line by the corrector.

Specifically, as illustrated in FIG. 1, the correction switch 20 includes a first push switch 20a to provide an instruction of correction in one direction in the width direction of the vehicle body 3, that is, in the leftward direction; and a second push switch 20b to provide an instruction of correction in the other direction in the width direction of the vehicle body 3, that is, in the rightward direction. In the following description, a correction amount h indicating a correction in the leftward direction is represented by a positive number (h>0), and a correction amount h indicating a correction in the rightward direction is represented by a negative number (h<0), as illustrated in FIG. 7.

The correction switch 20 is not limited to a push switch, and may be a slide switch capable of changing the amount of operation. In this case, the corrector 40c1 defines the correction amount h based on the amount of operation (the amount of shift) of the slide switch.

Hereinafter, correction of the scheduled travel line L2 and the reference line L1 based on the correction amount h by the corrector 40c1 will be described with reference to FIG. 6 and FIG. 7.

Figure 6:
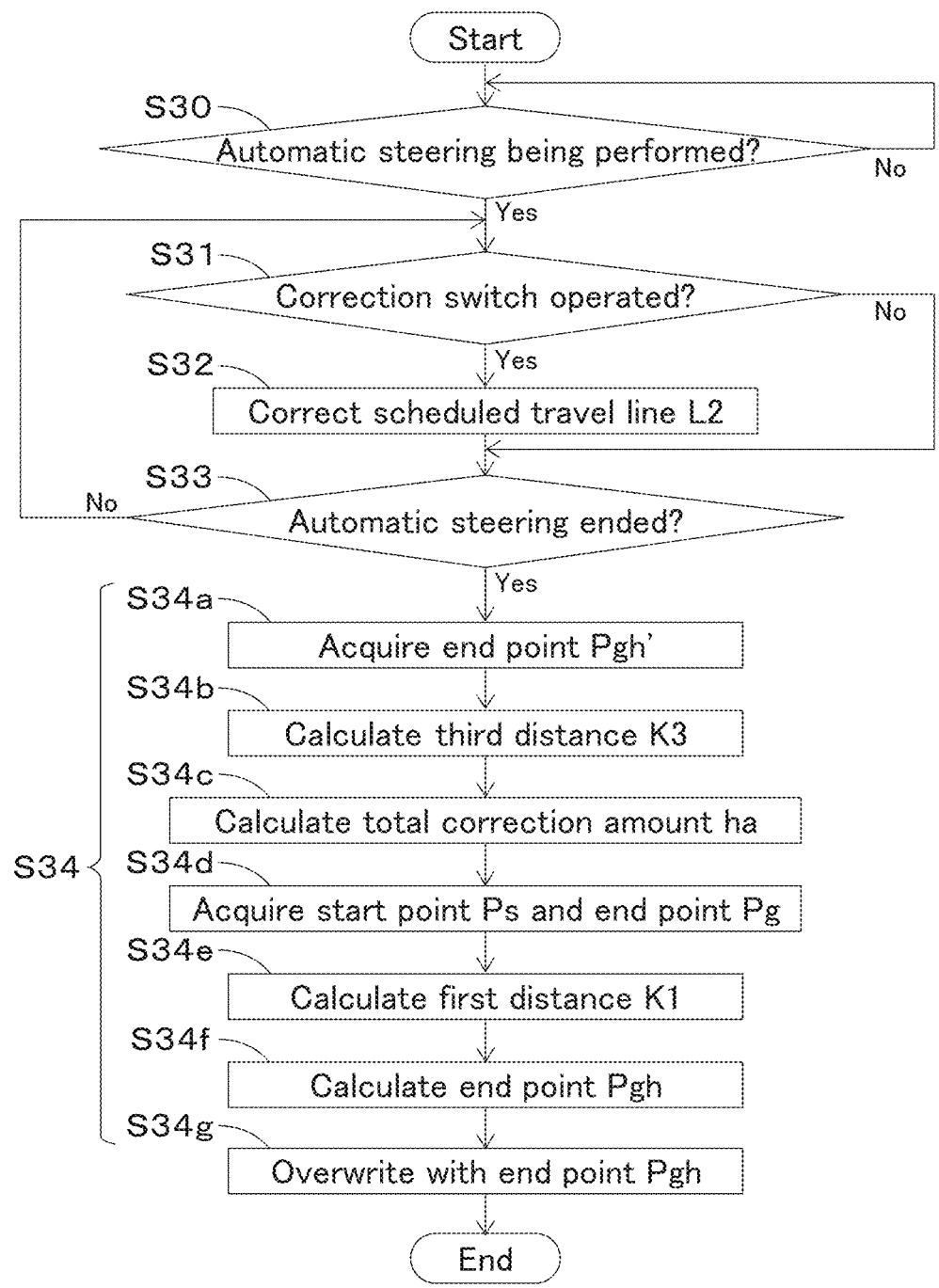
FIG. 6 is a flowchart illustrating a process of correcting a reference line by a corrector.

As illustrated in FIG. 6, the corrector 40c1 determines whether the automatic steering controller 40b is performing automatic steering (S30). For example, the corrector 40c1 determines that the automatic steering controller 40b is performing automatic steering in response to a third operation being performed on the steering changeover switch 19 or in response to determining that a control signal is output from the automatic steering controller 40b to the automatic steering mechanism 37.

When determining that the automatic steering controller 40b is performing automatic steering (Yes in S30), the corrector 40c1 determines whether the correction switch 20 has been operated (S31). If the controller 40 has acquired an operation signal from the correction switch 20, the corrector 40c1 determines that the correction switch 20 has been operated.

When determining that the correction switch 20 has been operated (Yes in S31), the corrector 40c1 corrects the scheduled travel line L2 in accordance with the operation of the correction switch 20 (S32). Specifically, the corrector 40c1 corrects the scheduled travel line L2 by shifting the scheduled travel line L2 in accordance with the correction amount h, as illustrated in FIG. 7. That is, the movement path of the working vehicle 1 shifts in the width direction by the correction amount h.

After correcting the scheduled travel line L2 (S32), the corrector 40c1 stores the correction amount h in the first memory 41.

After storing the correction amount h in the first memory 41, the corrector 40c1 determines whether the automatic steering controller 40b has ended the automatic steering (S33). For example, the corrector 40c1 determines that the automatic steering controller 40b has ended the automatic steering in response to a fourth operation being performed on the steering changeover switch 19 or in response to determining that a control signal is not output from the automatic steering controller 40b to the automatic steering mechanism 37.

When determining that the automatic steering controller 40b has ended the automatic steering (Yes in S33), the corrector 40c1 corrects the reference line L1 stored in the first memory 41 (S34). In the present preferred embodiment, as illustrated in FIG. 7, the corrector 40c1 corrects the reference line L1 by redefining an end point Pgh of a corrected reference line L1', that is, by overwriting the end point Pg of the reference line L1 stored in the first memory 41 with the end point Pgh. The corrector 40c1 calculates the corrected end point Pgh based on a distance K1 between the start point Ps and the end point Pg of the reference line L1 (the length of the reference line L1, a first distance), a distance K3 between the start point Ps' and the end point Pgh' of the corrected scheduled travel line L2' (the length of the corrected scheduled travel line L2, a third distance), and a total correction amount ha, which is the total of the correction amount h.

As illustrated in FIG. 7, the ratio between the third distance K3 and the total correction amount ha (K3:ha) is equal to the ratio between the first distance K1 and a fourth distance K4 (the distance between the end point Pg before correction and the end point Pgh after correction) (K1:K4). Thus, the corrector 40c1 calculates the ratio between the third distance K3 and the total correction amount ha (K3:ha), and calculates the fourth distance K4 from the ratio and the first distance K1, thus calculating the position information PI of the corrected end point Pgh.

Specifically, after S33, the corrector 40c1 acquires the current vehicle body position P (position information PI) when a fourth operation is performed on the steering changeover switch 19, that is, the latest position information PI, as the end point Pgh' of the corrected scheduled travel line L2' (S34a).

After acquiring the end point Pgh' (S34a), the corrector 40c1 calculates the third distance K3 based on the end point Pgh' and the start point Ps' held in the first memory 41 (S34b). After calculating the third distance K3, the corrector 40c1 calculates the total correction amount ha based on the correction amount h held in the first memory 41 (S34c).

After calculating the total correction amount ha (S34c), the corrector 40c1 acquires the start point Ps and the end point Pg of the reference line L1 stored in the first memory 41 (S34d). After acquiring the start point Ps and the end point Pg (S34d), the corrector 40c1 calculates the first distance K1 from the start point Ps and the end point Pg (S34e). In the present preferred embodiment, the position information PI is represented by a latitude and a longitude, and thus the corrector 40c1 calculates the first distance K1 from the latitude and longitude of the start point Ps and the latitude and longitude of the end point Pg.

After calculating the first distance K1 (S34e), the corrector 40c1 calculates the ratio between the third distance K3 and the total correction amount ha (K3:ha), and calculates the fourth distance K4 from the ratio and the first distance K1, thus calculating the position information PI of the corrected end point Pgh (S34f).

After calculating the position information PI of the corrected end point Pgh (S34f), the corrector 40c1 overwrites the end point Pg before correction stored in the first memory 41 with the corrected end point Pgh (S34g).

Accordingly, the corrector 40c1 is capable of correcting the scheduled travel line L2 and the reference line L1. Also when the reference line L1 stored in the first memory 41 is data indicating the reference line L1 (azimuth or function), the corrector 40c1 is capable of correcting the data by using a trigonometric function or the like. The correction method implemented by the corrector 40c1 is not limited to the above-described method as long as the reference line L1 can be corrected. In response to the reference line L1 being corrected by the corrector 40c1, the controller 40 changes the value of the data D1 in the correspondence information RD illustrated in FIG. 8A to a value indicating the corrected reference line L1, and causes the first memory 41 to store the changed value.

The line definer 40c is capable of transmitting the defined reference line L1 to the server 50, which will be described below, via the first communicator 42. Furthermore, the first communicator 42 is capable of receiving a reference line L1 from the server 50. The controller 40 stores the reference line L1 received by the first communicator 42 in the first memory 41. Accordingly, the automatic steering controller 40b is capable of performing automatic steering based on the received reference line L1.

Next, the server 50 will be described. As illustrated in FIG. 1, the server 50 is a fixed terminal, such as a fixed computer, provided outside the working vehicle 1. The server 50 is a fixed terminal installed in, for example, a farmhouse, a farming company, an agricultural machine manufacturer, an agricultural cooperative, or the like. The server 50 includes a server controller 51, a second communicator 52, a second memory 53, and a map memory 54.

The server controller 51 performs various control operations regarding the server 50. The server controller 51 includes electric and electronic components, a program, and so forth. The server controller 51 causes the second memory 53 to store information received by the second communicator 52 (for example, correspondence information RD).

The second communicator 52 is capable of communicating with the first communicator 42 of the working vehicle 1. The second communicator 52 performs, for example, wireless communication using a data communication network, a mobile phone communication network, or the like. The second communicator 52 is a communication module that performs either direct communication or indirect communication with the working vehicle 1 (the first communicator 42), and may perform, for example, wireless communication using Bluetooth (registered trademark) Low Energy in the specifications of Bluetooth (registered trademark) of the communication standard IEEE 802.15.1 series, WiFi (registered trademark) of the communication standard IEEE 802.11.n series, or the like.

The second memory 53 is a nonvolatile memory or the like capable of storing various programs and various pieces of information. The second memory 53 stores the correspondence information RD received by the second communicator 52. Thus, the second memory 53 is capable of storing the data D1 of the first setting information included in the correspondence information RD (i.e., the reference line L1 defined by the line definer 40c).

The map memory 54 stores one or more agricultural field maps MP each indicating an agricultural field H. The agricultural field map MP is map information including the agricultural field H and position information PI of the agricultural field H. Each of the agricultural field maps MP contains "a mapped center" indicating a center of the agricultural field H as a supplementary information, which is also stored in the map memory 54. In the present preferred embodiment, it is assumed that the map memory 54 stores in advance an agricultural field map MP1 indicating a first agricultural field H1 and an agricultural field map MP2 indicating a second agricultural field H2. The map information may be data in which a bird's-eye-view map, the contour of the agricultural field H on the map, and the position information PI of each map and the agricultural field H are associated with each other.

The server 50 includes an information manager 51a. The information manager 51a is provided in the server controller 51, and includes electric and electronic components provided in the server controller 51, a program installed in the server controller 51, and so forth.

The information manager 51a manages the information stored in the second memory 53. The information manager 51a has functions of deleting redundant information, thinning information, and so forth with respect to the information stored in the second memory 53, and is capable of efficiently managing the information.

Specifically, in a case of a plurality of pieces of the correspondence information RD having been stored in the second memory 53 in a chronological order based on the time information TI, the information manager 51a deletes, among a plurality of pieces of the setting information SI arranged in a chronological order, a piece of the setting information SI including contents that are the same as contents of an immediately preceding piece of the setting information SI.

In addition, in a case of a plurality of pieces of the first correspondence information 1RD having been arranged in a chronological order based on the time information TI, the information manager 51a performs, every predetermined third period (for example, about 1 minute), an operation of keeping only one of a plurality of pieces of the first correspondence information 1RD included in the third period and deleting the others of the plurality of pieces of the first correspondence information 1RD included in the third period. The third period (for example, about 1 minute) is longer than the first period (for example, 6 seconds) and shorter than the second period (for example, about 10 minutes). That is, thinning-out is performed to obtain one piece of the first correspondence information 1RD per minute.

Figure 9A:
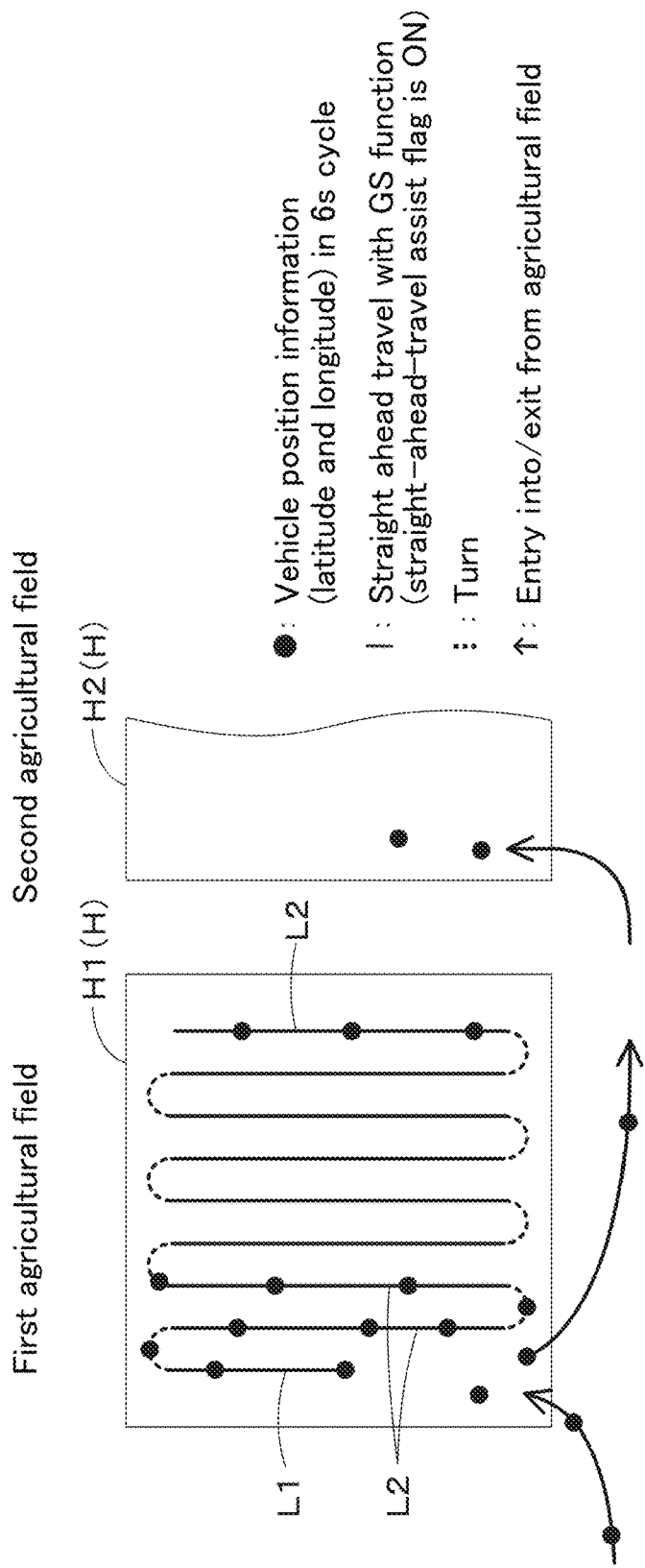
FIG. 9A is a diagram illustrating a travel route of a working vehicle and each piece of position information acquired every first period.
Figure 9B:
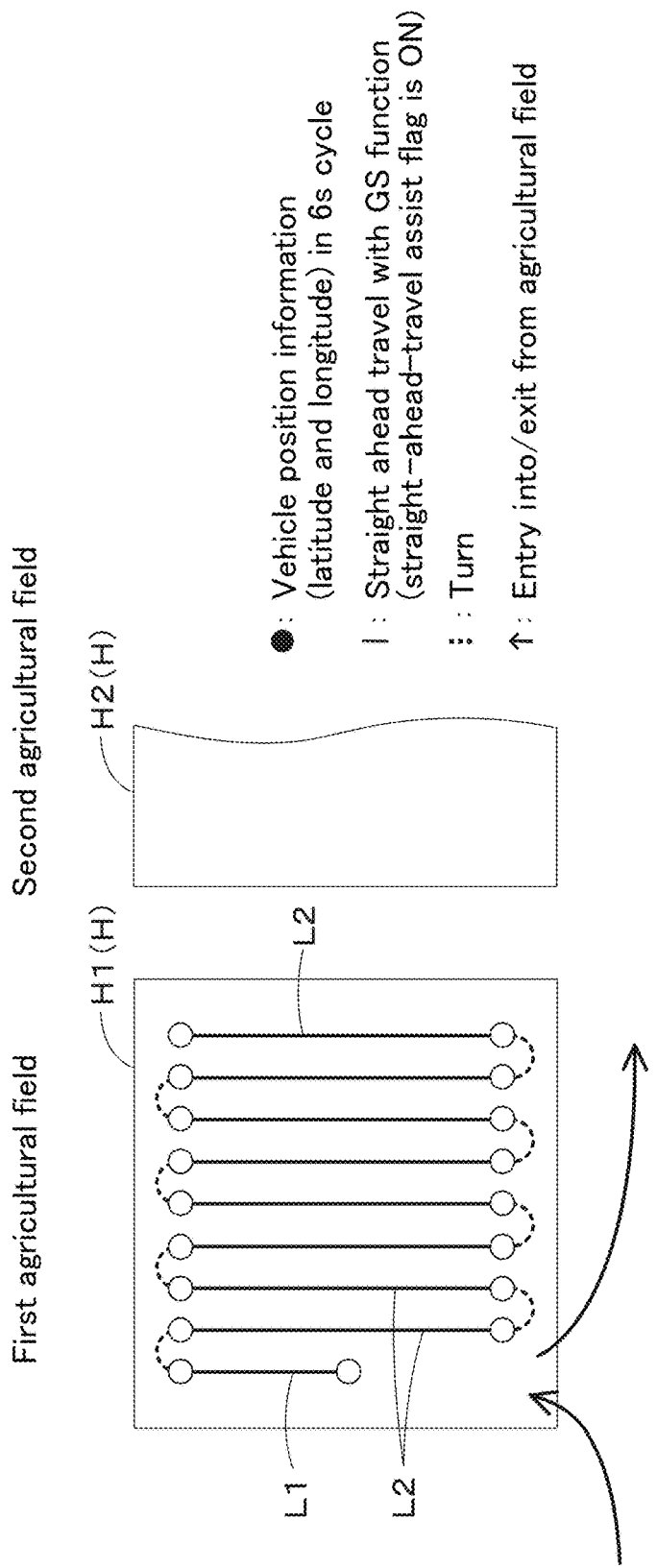
FIG. 9B is a diagram illustrating a start point and an end point of a reference line in the travel route illustrated in FIG. 9A, and individual positions of start and end of automatic steering.
Figure 9C:
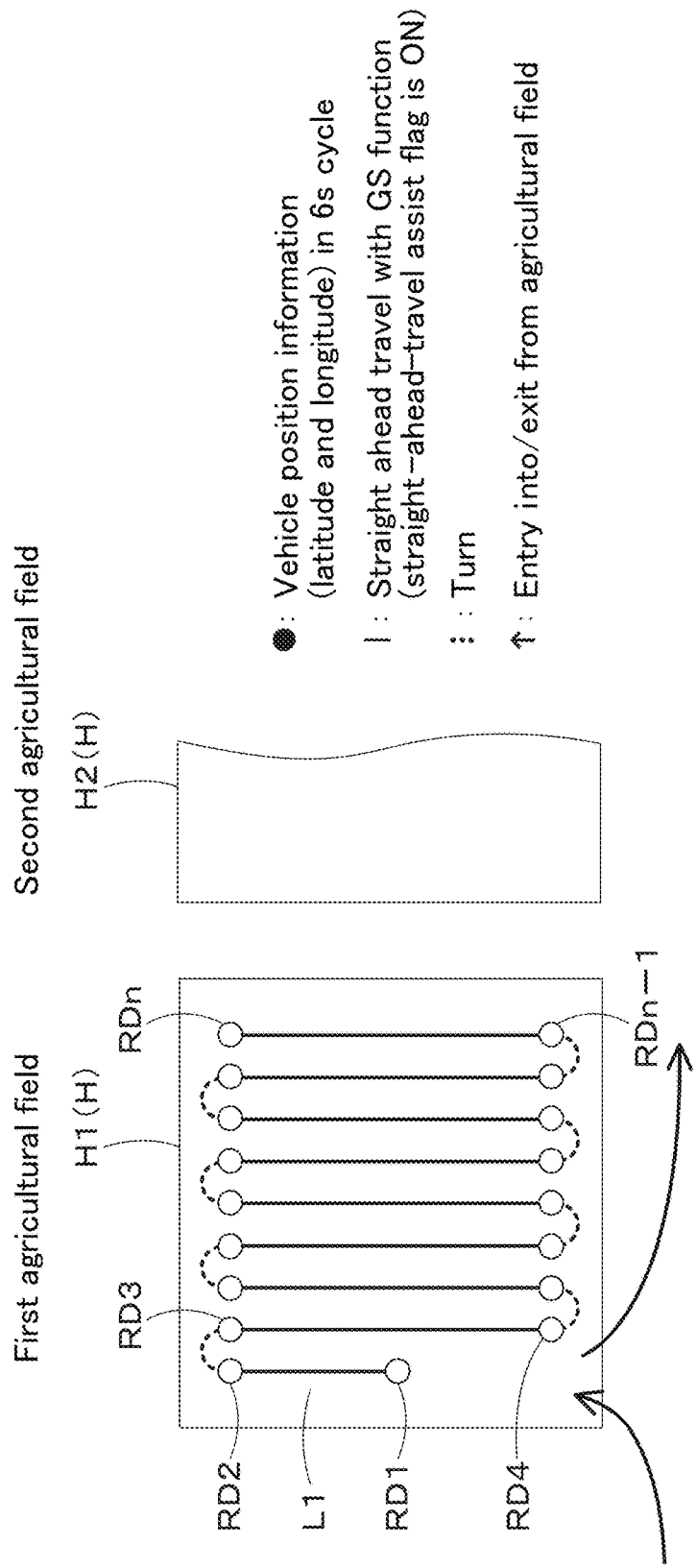
FIG. 9C is a diagram illustrating setting information (with change) of the working vehicle in the travel route illustrated in FIG. 9A.

Now, a detailed description will be given of generation, storage, and transmission of correspondence information RD by the controller 40 of the working vehicle 1, and management of the correspondence information RD received by the server 50 from the working vehicle 1, with reference to FIGS. 9A to 9C. FIG. 9A is a diagram illustrating a travel route of the working vehicle 1 and each piece of position information PI acquired every first period. FIG. 9B is a diagram illustrating a start point and an end point of the reference line L1 in the travel route illustrated in FIG. 9A, and individual positions of start and end of automatic steering. FIG. 9C is a diagram illustrating setting information SI (with change) of the working vehicle 1 in the travel route illustrated in FIG. 9A.

As illustrated in FIG. 9A, the controller 40 of the working vehicle 1 acquires the position information PI of the vehicle body 3 detected by the position detector 43 every time a first period (for example, about 6 seconds) elapses from a predetermined reference time point. The predetermined reference time point herein is a time point at which the operator turns ON the ignition key (a timing at which the engine is started). Alternatively, the reference time point may be a time point at which the controller 40 is activated, a time point at which an operation is performed on a start icon displayed on the display 25, or the like. The plurality of black dots illustrated in FIG. 9A indicate respective points at which the position information PI of the vehicle body 3 is acquired in the cycle of the first period (for example, 6 seconds).

The white dots at the lower end and the upper end of the reference line L1 illustrated in FIG. 9B indicate the start point and the end point of the reference line L1. The plurality of white dots on the scheduled travel lines L2 indicate the start and end positions of automatic steering.

The plurality of white dots illustrated in FIG. 9C indicate the respective pieces of correspondence information RD including the setting information SI (with change) of the working vehicle 1 on the travel route illustrated in FIG. 9A. Among the plurality of pieces of correspondence information RD stored in the second memory 53 of the server 50, the pieces of correspondence information RD1 to RDn−1 at the plurality of white dots illustrated in FIG. 9C are not deleted but are continuously stored.

Figure 11:
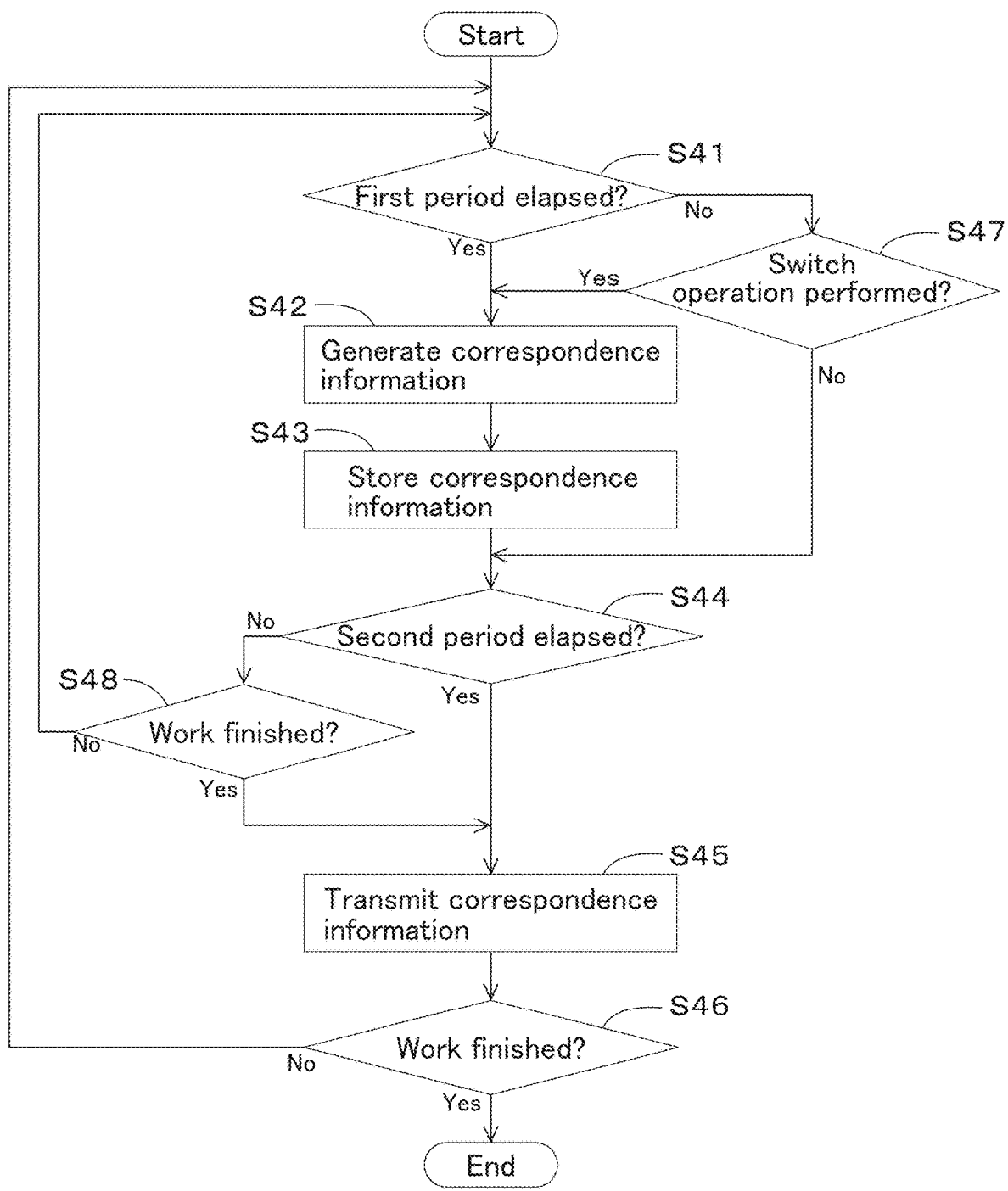
FIG. 11 is a flowchart illustrating a process performed by a controller of the working vehicle.

FIG. 10A is a diagram illustrating an example of the correspondence information RD generated by the working vehicle 1 in a certain period and transmitted to the server 50. The period defined by each of the double-pointed arrows illustrated in FIG. 10A is 6 seconds. The period from time t_1 to time t_2 is about 6 seconds, for example. In addition, the period from time t_2 to time t_4, the period from time t_4 to time t_6, the period from time t_7 to time t_9, and the period from time t_15 to time t_17 are each about 6 seconds, for example. FIG. 11 is a flowchart illustrating a process performed by the controller 40 of the working vehicle 1.

As illustrated in FIG. 11, the controller 40 determines whether the first period (for example, about 6 seconds) has elapsed (S41). When determining that the first period has elapsed (Yes in S41), the controller 40 generates first correspondence information 1RD (correspondence information RD) (S42). Specifically, as illustrated in FIG. 10A, the controller 40 generates the first correspondence information 1RD in which the time information TI indicating the time at which the first period has elapsed and the position information PI of the vehicle body 3 detected by the position detector 43 at this time are associated with each other. For example, at a time point at which about 6 seconds have elapsed, first correspondence information 1RD in which the time information TI (=t_1) and the position information PI (=p_1) of the vehicle body 3 are associated with each other is generated. The controller 40 causes the first memory 41 to store the generated first correspondence information 1RD (S43).

When determining that the first period has not elapsed (No in S41), the controller 40 determines whether a switch operation has been performed (S47). Specifically, if the setting switch 17, the registration switch 18, the steering changeover switch 19, the correction switch 20, various switches displayed on the display 25, or the like has been operated, the controller 40 determines that a switch operation has been performed (Yes in S47), generates correspondence information RD (S42), causes the first memory 41 to store the correspondence information RD (S43), and proceeds to S44.

For example, at time t_3 indicated by the time information TI illustrated in FIG. 10A, the setting switch 17 is operated and the setting mode flag FL1 is changed. Thus, the controller 40 generates second correspondence information 2RD (correspondence information RD) having changed setting information SI, and causes the first memory 41 to store the second correspondence information 2RD. That is, for this time information TI (=t_3), the second correspondence information 2RD in which the time information TI (=t_3) and the setting mode flag FL1 (=f1_1) of the second setting information in the setting information SI of the working vehicle 1 are associated with each other is obtained.

For example, at time t_5 indicated by the time information TI illustrated in FIG. 10A, the steering changeover switch 19 is operated and the straight-ahead-travel assist flag FL4 is changed. Thus, the controller 40 generates third correspondence information 3RD (correspondence information RD) having changed setting information SI, and causes the first memory 41 to store the third correspondence information 3RD. That is, for this time information TI (=t_5), the third correspondence information 3RD in which the time information TI (=t_5), the straight-ahead-travel assist flag FL4 (=f4_1) of the second setting information in the setting information SI of the working vehicle 1, and the first setting information (=d_1) in the setting information SI of the working vehicle 1 are associated with each other is obtained. In addition, for the time information TI (=t_8), the third correspondence information 3RD in which the time information TI (=t_8), the straight-ahead-travel assist flag FL4 (=f4_2) of the second setting information in the setting information SI of the working vehicle 1, and the first setting information (=d_1) in the setting information SI of the working vehicle 1 are associated with each other is obtained. In addition, for the time information TI (=t_16), the third correspondence information 3RD in which the time information TI (=t_16), the straight-ahead-travel assist flag FL4 (=f4_3) of the second setting information in the setting information SI of the working vehicle 1, and the first setting information (=d_2) in the setting information SI of the working vehicle 1 are associated with each other is obtained.

The various switches displayed on the display 25 include first to seventh display switches to change the values of the respective pieces of data D1 to D7 illustrated in FIG. 8B. That is, the first to seventh display switches are switches to change the reference line azimuth, the work type state, the work width, the overlapped width, the work route, the control gain, and the setting status, respectively. Thus, in response to any one of the first to seventh display switches being operated, the controller 40 generates correspondence information RD having changed setting information SI, and causes the first memory 41 to store the correspondence information RD. In response to the correction switch 20 being operated, the controller 40 generates correspondence information RD having changed setting information SI, and causes the first memory 41 to store the correspondence information RD.

On the other hand, if none of the setting switch 17, the registration switch 18, the steering changeover switch 19, and so forth has been operated (No in S47), the controller 40 proceeds to S44.

The controller 40 determines whether the second period (for example, about 10 minutes) has elapsed (S44). When determining that the second period has elapsed (Yes in S44), the controller 40 causes the first communicator 42 to transmit the correspondence information RD to the server 50 (S45). Specifically, a plurality of (for example, 100 or more) pieces of correspondence information RD generated in the second period (for example, about 10 minutes) are transmitted from the first communicator 42 to the server 50 immediately after the second period (for example, about 10 minutes) has elapsed. The controller 40 causes a plurality of pieces of correspondence information RD to be transmitted every time the second period (for example, about 10 minutes) elapses from the above-described reference time point.

The controller 40 determines whether the work has finished (S46). For example, if the operator has turned OFF the ignition key, the controller 40 determines that the work has finished (Yes in S46), and ends the process. On the other hand, if the operator has not turned OFF the ignition key, the controller 40 determines that the work has not finished (No in S46), and returns to S41.

When determining that the second period has not elapsed (No in S44), the controller 40 determines whether the work has finished (S48). If the operator has not turned OFF the ignition key, the controller 40 determines that the work has not finished (No in S48), and returns to S41. On the other hand, if the operator has turned OFF the ignition key, the controller 40 determines that the work has finished (Yes in S48). Subsequently, the controller 40 causes the correspondence information RD generated by the time point at which the ignition key is turned OFF, that is, the correspondence information RD for a period shorter than the second period (for example, about 10 minutes), to be transmitted (S45), determines that the work has finished (Yes in S46), and ends the process.

Figure 12A:
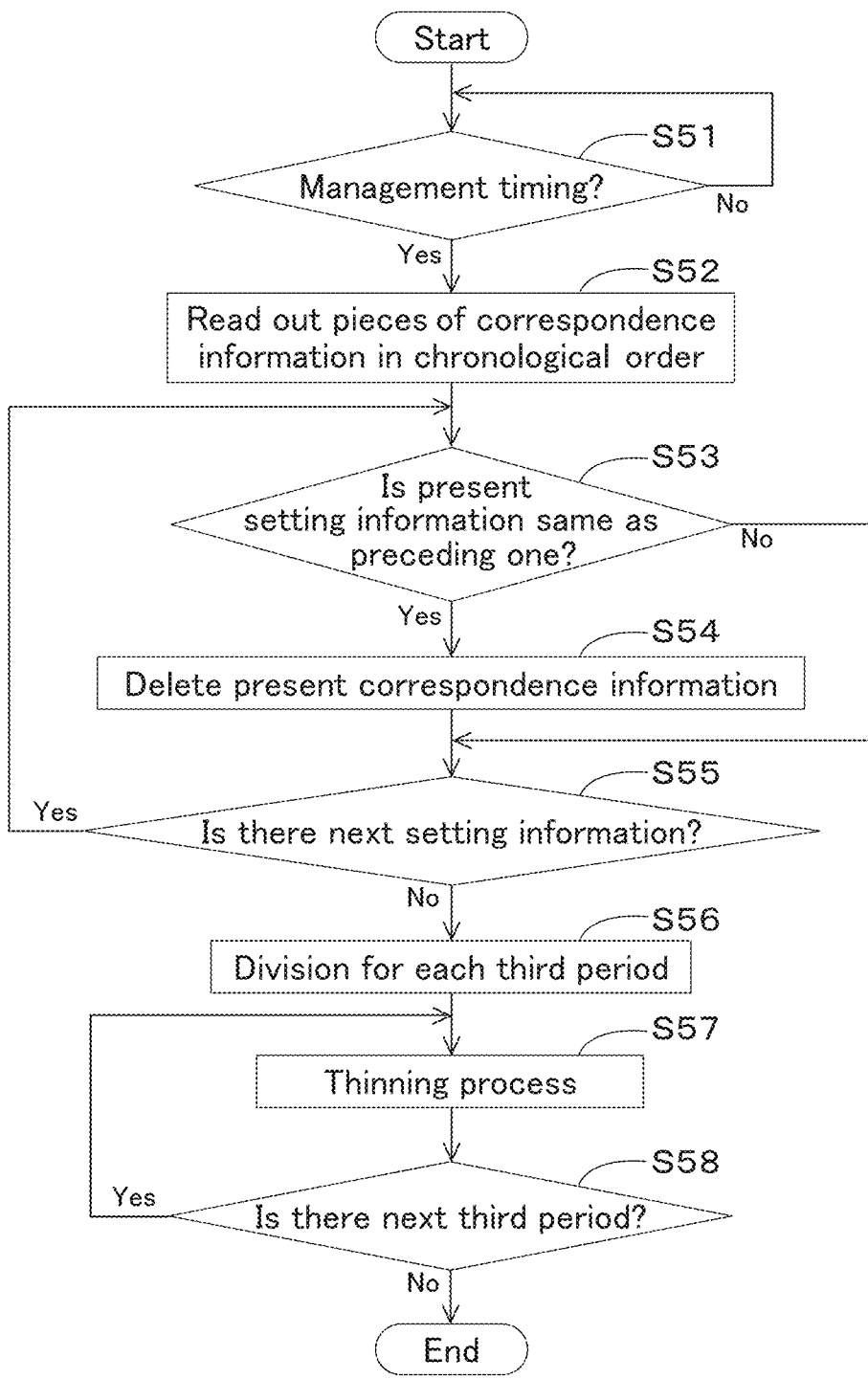
FIG. 12A is a flowchart illustrating a process of managing correspondence information performed by a server controller.

Next, information management in the server 50 will be described. The server 50 receives a plurality of pieces of correspondence information RD from the working vehicle 1, for example, every second period, and causes the second memory 53 to store the pieces of correspondence information RD. The information manager 51a of the server controller 51 manages the information stored in the second memory 53. FIG. 12A is a flowchart illustrating a process of managing the correspondence information RD performed by the server controller 51.

The information manager 51a determines whether a management timing has come (S51). The management timing herein is a timing of a management cycle predetermined in the server 50 (every day or every week), but is not limited thereto. The management timing may be, for example, a timing at which a management start instruction is provided from an administrator to the server 50. The management timing may be a timing at which, among the plurality of pieces of correspondence information RD stored in the second memory 53, a plurality of pieces of correspondence information RD arranged in a chronological order from a piece of correspondence information RD having the setting mode changed from disabled to enabled to a piece of correspondence information RD having the setting mode changed from enabled to disabled are specified. The management timing may be a timing at which a plurality of (for example, 100 or more) pieces of correspondence information RD generated in the second period (for example, about 10 minutes) illustrated in FIG. 10A are recorded. When determining that the management timing has not come (No in S51), the information manager 51a returns to S51 and waits until the management timing comes.

On the other hand, when determining that the management timing has come (Yes in S51), the information manager 51a reads out the plurality of pieces of third correspondence information 3RD stored in the second memory 53 in a chronological order (S52). FIG. 10B is a diagram illustrating an example in which duplicate correspondence information RD is deleted and managed in the server 50. The information manager 51a determines whether the first setting information of the setting information SI of the present third correspondence information 3RD is the same as the preceding one (S53). When determining that the first setting information of the present setting information SI is the same (Yes in S53), the information manager 51a deletes the present third correspondence information 3RD (S54). As illustrated in FIG. 10B, for example, the information manager 51a determines that the first setting information ($=d\_1$) of the setting information SI of the third correspondence information 3RD including the time information TI ($=t\_8$) is the same as the immediately preceding first setting information ($=d\_1$) of the setting information SI of the third correspondence information 3RD including the time information TI ($=t\_5$), and deletes the third correspondence information 3RD including the time information TI ($=t\_8$).

On the other hand, when determining that the present setting information SI is not the same (No in S53), the information manager 51a proceeds to S55 without deleting the present setting information SI. As illustrated in FIG. 10B, for example, the information manager 51a determines that the first setting information ($=d\_2$) of the setting information SI of the third correspondence information 3RD including the time information TI ($=t\_16$) is not the same as the immediately preceding first setting information ($=d\_1$) of the setting information SI of the third correspondence information 3RD including the time information TI ($=t\_5$), and does not delete the third correspondence information 3RD including the time information TI ($=t\_16$).

The information manager 51a determines whether there is the next piece of setting information SI (S55). When determining that there is the next piece of setting information SI (Yes in S55), the information manager 51a returns to S53.

On the other hand, when determining that there is no next piece of setting information SI (No in S55), the information manager 51a arranges the plurality of pieces of first correspondence information 1RD stored in the second memory 53 in a chronological order and divides the pieces of first correspondence information 1RD for each third period (for example, 1 minute) (S56).

The information manager 51a performs, every third period (for example, about 1 minute), an operation of keeping only one of a plurality of pieces of first correspondence information 1RD included in the third period and deleting the others of the plurality of pieces of first correspondence information 1RD (S57). That is, thinning-out is performed to obtain one piece of first correspondence information 1RD per minute. As illustrated in FIG. 10B, when there are a plurality of pieces of first correspondence information 1RD corresponding to time $t\_1$ to time $t\_17$ and the subsequent time (for example, about 1 minute) as a plurality of pieces of first correspondence information 1RD included in the third period (for example, about 1 minute), only the piece of first correspondence information 1RD including the first time information TI ($=t\_1$) is kept, and all the other pieces of first correspondence information 1RD corresponding to time $t\_2$ to time $t\_17$ and the subsequent time (for example, about 1 minute) are deleted.

The information manager 51a determines whether there is the next third period for the plurality of pieces of first correspondence information 1RD (S58). If there is the next third period for the plurality of pieces of first correspondence information 1RD (Yes in S58), the information manager 51a returns to S57. If there is no next third period for the plurality of pieces of first correspondence information 1RD (No in S58), the information manager 51a ends the process.

Among the plurality of pieces of correspondence information RD stored in the second memory 53 of the server 50, the pieces of correspondence information RD marked with a cross are deleted, as illustrated in FIG. 10B. For example, the pieces of first correspondence information 1RD are thinned out to one piece every minute. As for the third correspondence information 3RD, a piece that is the same as the preceding one is deleted. In this way, it is possible to appropriately manage important correspondence information RD related to automatic steering of the working vehicle 1 in the agricultural field H, and significantly reduce the amount of correspondence information RD to be stored.

The management system S according to the first preferred embodiment described above includes the working vehicle 1 and the server 50. The working vehicle 1 includes the working device 2, the vehicle body 3 capable of traveling by either automatic steering based on a reference line L1 or manual steering, the position detector 43 to detect a position of the vehicle body 3. the timer 40a, the first memory 41 to store, in a case where the vehicle body 3 is automatically steered, correspondence information RD in which time information TI measured by the timer 40a and at least one of setting information SI of the working vehicle 1 or position information PI of the vehicle body 3 are associated with each other, and the first communicator 42 to transmit the correspondence information RD stored in the first memory 41 to the server 50. The server 50 includes the second communicator 52 to receive the correspondence information RD transmitted by the first communicator 42, and the second memory 53 to store the correspondence information RD received by the second communicator 52. With this configuration, in a case where the vehicle body 3 is automatically steered based on the reference line L1 in an agricultural field H, the time information TI and the setting information SI of the working vehicle 1 are stored in the server 50. That is, every time automatic steering is performed in the agricultural field H, the setting information SI of the working vehicle 1 and the time information TI can be stored in the server 50. This makes it possible to manage, in units of pieces of work, the setting information SI of the working vehicle 1 set in agricultural field work.

The working vehicle 1 includes the steering changeover switch 19 to be instructed to start and end automatic steering; the automatic steering mechanism 37 to perform automatic steering of the vehicle body 3 based on the position of the vehicle body 3 detected by the position detector 43 and the reference line L1, in response to the steering changeover switch 19 being instructed to start automatic steering; and the controller 40 to generate the correspondence information RD and cause the first memory 41 to store the correspondence information RD, in response to the steering changeover switch 19 being instructed to start or end automatic steering. With this configuration, the correspondence information RD including the setting information SI of the working vehicle 1 is generated and stored in the first memory 41 at the start and end of automatic steering. The correspondence information RD stored in the first memory 41 is transmitted from the first communicator 42 of the working vehicle 1 to the server 50. This makes it possible to reliably store the setting information SI at the start of automatic steering and the setting information SI at the end of automatic steering in the server 50. In the server 50, the start and end of automatic steering can be accurately specified.

The controller 40 generates the correspondence information RD and causes the first memory 41 to store the correspondence information RD, in response to an instruction to change the setting information SI of the working vehicle 1 being provided. With this configuration, in response to the setting information SI of the working vehicle 1 being changed in automatic steering, changed correspondence information RD is generated and stored in the first memory 41. The changed correspondence information RD stored in the first memory 41 is transmitted from the first communicator 42 of the working vehicle 1 to the server 50. Thus, the setting information SI changed during automatic steering can be reliably stored in the server 50. In the server 50, the fact that the setting information SI was changed during automatic steering can be accurately specified.

Every time a predetermined first period elapses, the controller 40 generates the correspondence information RD and causes the first memory 41 to store the correspondence information RD. The first communicator 42 transmits the correspondence information RD stored in the first memory 41 to the server 50. With this configuration, the first correspondence information 1RD in which the time information TI and the position information PI of the working vehicle 1 are associated with each other is transmitted regardless of whether the setting mode is enabled. Thus, the time information TI and the position information PI of the working vehicle 1 can be managed by the server 50.

In response to an elapse of a predetermined second period longer than the first period, the controller 40 causes the first communicator 42 to transmit, to the server 50, a plurality of pieces of the correspondence information RD generated and stored in the first memory 41 in the second period. With this configuration, in a case where the vehicle body 3 is automatically steered based on the reference line L1 in the agricultural field H, the first correspondence information 1RD is generated every time the first period elapses, and in response to an elapse of the second period longer than the first period, the plurality of pieces of correspondence information RD (first correspondence information 1RD to third correspondence information 3RD, etc.) generated in the second period are transmitted to the server 50. Thus, compared to a configuration in which transmission is constantly performed, it is sufficient to perform transmission every first period, and a transmission processing load in the working vehicle 1 can be reduced. In addition, the frequency of storing in the server 50 can be reduced to about once the second period.

The server 50 includes the information manager 51a to manage information stored in the second memory 53. In a case of a plurality of pieces of the correspondence information RD having been stored in the second memory 53 in a chronological order based on the time information TI, the information manager 51a deletes, among a plurality of pieces of the setting information SI arranged in a chronological order, a piece of the setting information SI including contents that are the same as contents of an immediately preceding piece of the setting information SI. With this configuration, among a plurality of pieces of the setting information SI arranged in a chronological order, only a piece of the setting information SI that has changed to contents different from those of the immediately preceding piece of the setting information SI is stored, and a piece of the setting information SI including contents that are the same as those of the immediately preceding piece of the setting information SI, that is, a redundant piece of the setting information SI, can be deleted. Thus, the actually used setting information SI can be efficiently managed without redundancy.

In addition, in a case of a plurality of pieces of the first correspondence information 1RD having been arranged in a chronological order based on the time information TI, the information manager 51a performs, every predetermined third period (for example, 1 minute), an operation of keeping only one of a plurality of pieces of the first correspondence information 1RD included in the third period and deleting the others of the plurality of pieces of the first correspondence information 1RD included in the third period. Thus, a plurality of pieces of the first correspondence information 1RD can be managed by thinning out them into only one piece every third period. Accordingly, the amount of the correspondence information RD to be stored in the server 50 can be reduced.

The information manager 51a may set, as the start point of the third period, the time indicated by the time information TI associated with a piece of the setting information SI that has been changed among a plurality of pieces of the setting information SI arranged in a chronological order.

Figure 13:
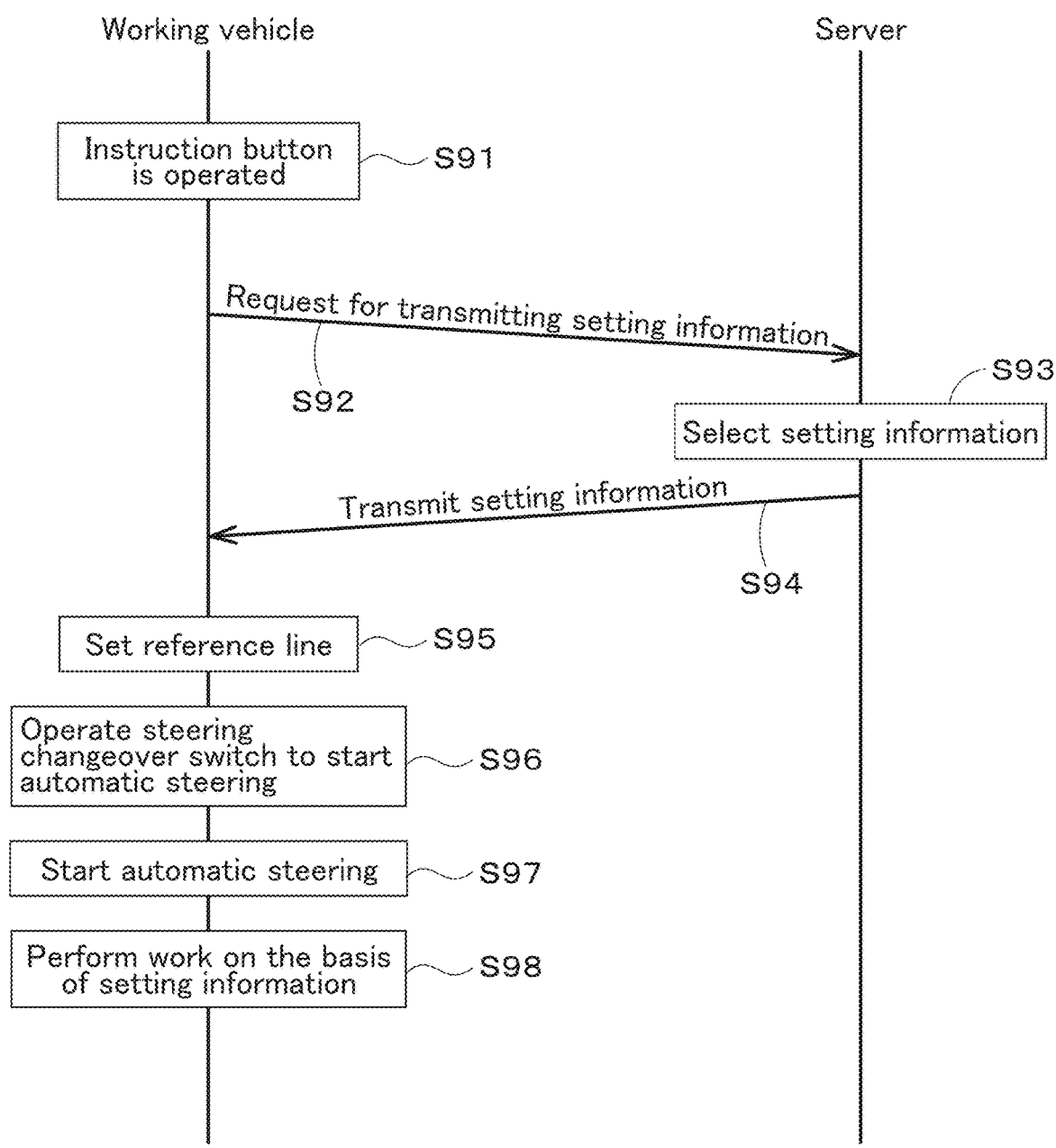
FIG. 13 is a diagram illustrating a procedure in which the working vehicle downloads correspondence information managed by the server and executes work.

As illustrated in FIG. 13, the setting information SI of the correspondence information RD managed in the second memory 53 of the server 50 can be downloaded and utilized by the working vehicle 1. FIG. 13 is a diagram illustrating a procedure in which the working vehicle 1 downloads the correspondence information RD managed by the server 50 and executes work.

As illustrated in FIG. 13, the controller 40 of the working vehicle 1 communicates with the server 50 via the first communicator 42, and acquires selection item information indicating the agricultural field H, the setting information SI, and so forth managed by the server Based on the acquired selection item information, the controller 40 causes the display 25 to display an instruction button for requesting the setting information SI stored in the server 50. In response to the instruction button on the display 25 being touch-operated (S91), the controller 40 causes the first communicator 42 to transmit a request signal for the setting information SI to the server 50, thus making a request to transmit the setting information SI (S92). For example, the request signal for the setting information SI includes information to specify an agricultural field H (information indicating the agricultural field H selected by the operator from among the agricultural fields H displayed on the display 25, the position information PI of the working vehicle 1, or the like).

In response to receipt of the request signal for the setting information SI, the server selects, based on the information to specify the agricultural field H, the corresponding piece of setting information SI from among the plurality of pieces of setting information SI stored in the second memory 53 (S93). If the operator has selected an agricultural field H, the setting information SI in the selected agricultural field H is selected. If the operator has not selected an agricultural field H, the agricultural field H including the position information PI of the working vehicle 1 or the agricultural field H in the vicinity thereof is determined, and the setting information SI in the determined agricultural field H is selected. Subsequently, the server 50 transmits the selected setting information SI to the working vehicle 1 by the second communicator 52 (S94).

The controller 40 of the working vehicle 1 sets a reference line L1 by using the data D1 (reference line L1 or reference line L1 azimuth) included in the setting information SI received by the first communicator 42 (S95). In response to the steering changeover switch 19 being instructed to start automatic steering (S96), the automatic steering mechanism 37 of the working vehicle 1 performs automatic steering of the vehicle body 3 based on the position of the vehicle body 3 detected by the position detector 43 and the setting information SI received by the first communicator 42 (S97). The working device 2 performs work based on the setting information SI received by the first communicator 42 (S98).

As described above, in response to a request to transmit the setting information SI being received from the working vehicle 1, the server 50 transmits, by the second communicator 52, the setting information SI stored in the second memory 53 to the working vehicle 1. In response to the steering changeover switch 19 being instructed to start automatic steering, the automatic steering mechanism 37 performs automatic steering of the vehicle body 3 based on the position of the vehicle body 3 detected by the position detector 43 and the setting information SI received by the first communicator 42. The working device 2 performs work based on the setting information SI received by the first communicator 42. With this configuration, the working vehicle 1 is capable of downloading the setting information SI stored in the server 50 and performing automatic steering and work by using the setting information SI.

Although the server 50 transmits the setting information SI in FIG. 13, the server 50 may transmit the setting information SI and the position information PI or the correspondence information RD to the working vehicle 1. The controller 40 of the working vehicle 1 may cause the working device 2 to perform the same work as the preceding work for each scheduled travel line L2 based on the received setting information SI and position information PI or the received correspondence information RD.

Modification of First Preferred Embodiment

Figure 12B:
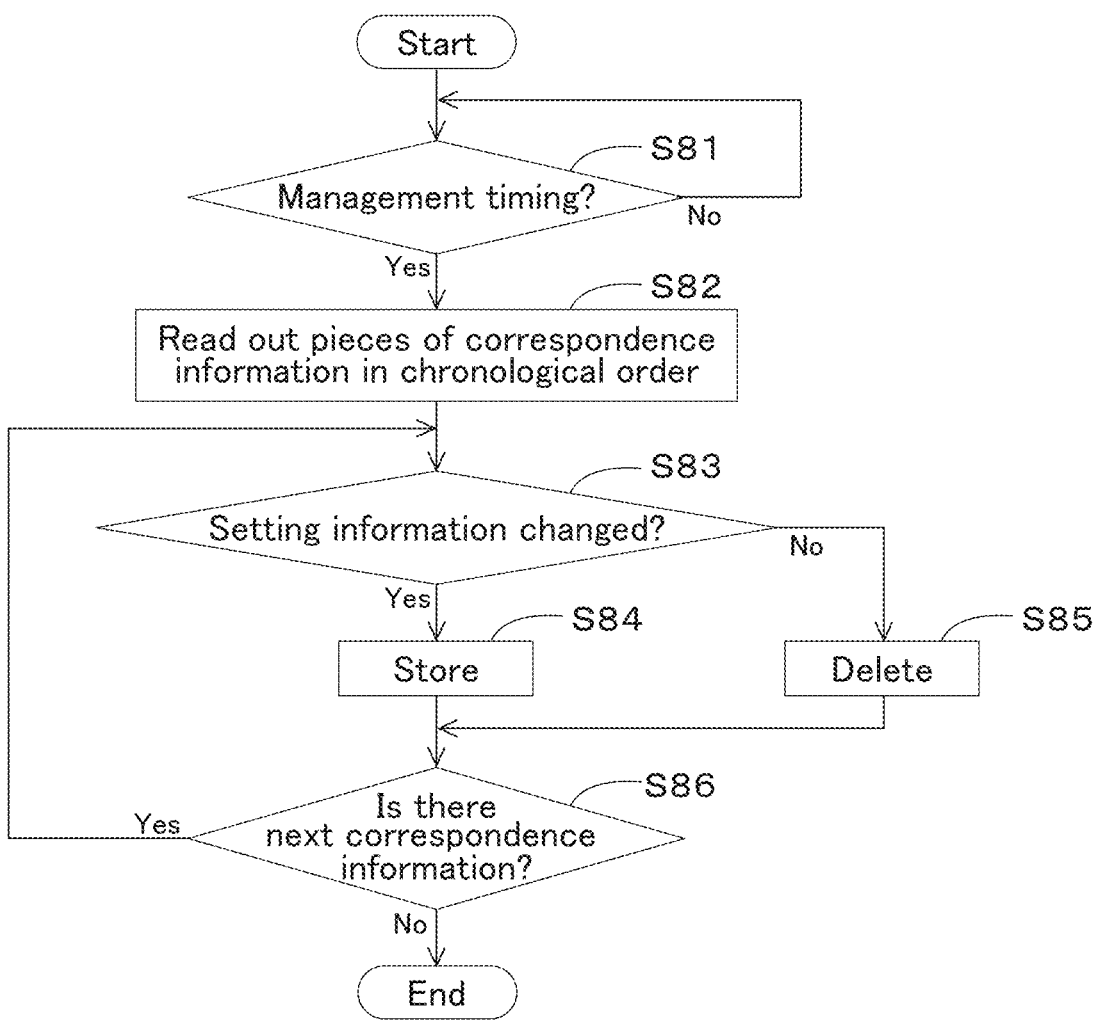
FIG. 12B is a flowchart illustrating a management process according to a modification of the first preferred embodiment of the present invention.

FIG. 12B is a flowchart illustrating a management process according to a modification of the first preferred embodiment. In the modification of the first preferred embodiment, the information manager 51a of the server controller 51 performs the management process illustrated in FIG. 12B instead of the management process illustrated in FIG. 12A.

In a case of a plurality of pieces of the correspondence information RD having been stored in the second memory 53 in a chronological order based on the time information TI, the information manager 51a keeps a piece of the correspondence information RD of a piece of the setting information SI different from the immediately preceding piece of the setting information SI among a plurality of pieces of the setting information SI arranged in a chronological order, and deletes a piece of the correspondence information RD of a piece of the setting information SI that is the same as the immediately preceding piece of the setting information SI among the plurality of pieces of the setting information SI arranged in a chronological order.

The information manager 51a determines whether a management timing has come (S81). When determining that a management time has come (Yes in S81), the information manager 51a reads out the plurality of pieces of correspondence information RD stored in the second memory 53 in a chronological order (S82). On the other hand, when determining that a management timing has not come (No in S81), the information manager 51a returns to S81 and waits until a management timing comes.

The information manager 51a determines, for the plurality of pieces of correspondence information RD stored in the second memory 53, whether the present setting information SI has been changed from the immediately preceding setting information SI (S83). When determining that the present setting information SI has been changed (Yes in S83), the information manager 51a stores the present setting information SI, that is, the changed setting information SI (S84). On the other hand, when determining that the present setting information SI has not been changed (No in S83), the information manager 51a deletes the present setting information SI (S85).

The information manager 51a determines whether there is the next piece of correspondence information RD (S86). When determining that there is the next piece of correspondence information RD (Yes in S86), the information manager 51a returns to S83. On the other hand, when determining that there is no next piece of correspondence information RD (No in S86), the information manager 51a ends the process.

As illustrated in FIG. 9C, the pieces of correspondence information RD at the two white dots on the first scheduled travel line L2, that is, the pieces of correspondence information RD at the respective positions of the start and end of automatic steering on the first scheduled travel line L2, are kept in the second memory 53, and the pieces of correspondence information RD at the other positions on the first scheduled travel line L2 are deleted from the second memory 53.

In the modification of the first preferred embodiment, in a case of a plurality of pieces of the correspondence information RD having been stored in the second memory 53 in a chronological order based on the time information TI, the information manager 51a keeps a piece of the correspondence information RD of a piece of the setting information SI different from the immediately preceding piece of the setting information SI among a plurality of pieces of the setting information SI arranged in a chronological order, and deletes a piece of the correspondence information RD of a piece of the setting information SI that is the same as the immediately preceding piece of the setting information SI among the plurality of pieces of the setting information SI arranged in a chronological order.

With this configuration, among a plurality of pieces of the correspondence information RD arranged in a chronological order, a piece of the correspondence information RD of a piece of the setting information SI different from the immediately preceding piece of the setting information SI is kept, and a piece of the correspondence information RD of a piece of the setting information SI that is the same as the immediately preceding piece of the setting information SI is deleted. Thus, it is possible to appropriately keep only the correspondence information RD of the changed setting information SI. Accordingly, the amount the position information PI to be stored in the server 50 can be further reduced.

In a case of a plurality of pieces of the correspondence information RD having been stored in the second memory 53 in a chronological order based on the time information TI, the information manager 51a may delete, among a plurality of pieces of the setting information SI arranged in a chronological order, a piece of the setting information SI including contents that are the same as contents of another piece of the setting information SI within the same day. In this case, only pieces of the setting information SI having different contents within the same day can be kept. Thus, the actually used setting information SI can be more efficiently managed.

Second Preferred Embodiment

Figure 14:
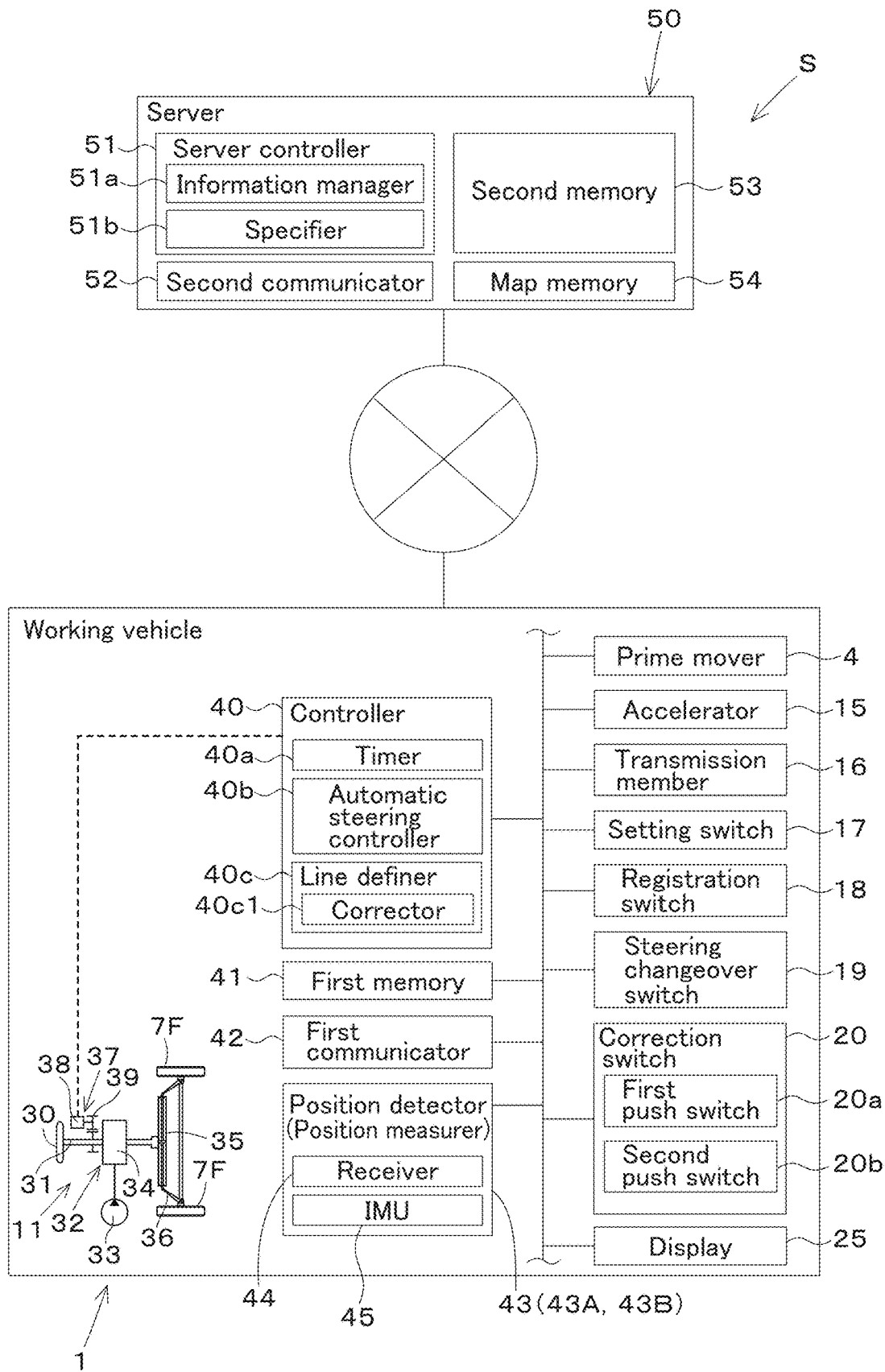
FIG. 14 is an overall view of a management system according to a second preferred embodiment of the present invention.

FIG. 14 illustrates an overall view of the management system S according to a second preferred embodiment. The information manager 51a of the server 50 of the second preferred embodiment is further capable of managing a plurality of pieces of correspondence information RD stored in the second memory 53 based on setting mode information. Thus, the plurality of pieces of correspondence information RD stored in the second memory 53 can be managed in units of agricultural fields H. The same components as those in the first preferred embodiment are denoted by the same reference numerals, and the description thereof will be omitted.

As in the first preferred embodiment, the controller 40 of the working vehicle 1 causes the first memory 41 to store correspondence information RD, as illustrated in FIG. 8A. The correspondence information RD is information in which time information TI, position information PI, and setting information SI of the working vehicle 1 are associated with each other, and includes setting mode information (setting mode flag FL1) indicating whether the setting mode is enabled or disabled.

As illustrated in FIG. 14, the server 50 of the second preferred embodiment further includes a specifier 51b. That is, the server 50 includes the information manager 51a and the specifier 51b. The specifier 51b is provided in the server controller 51, and includes electric and electronic components provided in the server controller 51, a program installed in the server controller 51, and so forth.

The specifier 51b specifies a working period of the working vehicle 1 based on the time information TI associated with a group of pieces of position information PI arranged in a chronological order and associated with the setting mode information (setting mode flag FL1) indicating that the setting mode is enabled in the correspondence information RD stored in the second memory 53. The specifier 51b calculates a position of "an averaged center" CG by summing or consolidating a plurality of positions (the position information PI) detected by the position detector 43 of the vehicle body 3 during traveling along the inner side of the boundary of the agricultural field H, and dividing the number of the plurality of positions (the position information PI) as described later with FIG. 15D. The specifier 51b then specifies one of the mapped centers MG closest to the first averaged center CG1 among the mapped centers MG of the plurality of agricultural fields contained in the agricultural field maps MP. The specifier 51b then specifies the agricultural field H having the closest center of mapped center MG as the agricultural field H in which the working vehicle 1 has worked.

The information manager 51a associates the agricultural field H specified by the specifier 51b, the working period specified by the specifier 51b, and the correspondence information RD in the second memory 53 corresponding to the working period with each other.

In a case where the setting mode indicated by the setting mode information remains enabled and where the position information PI changes from a value indicating a position in the first agricultural field H1 to a value indicating a position outside the first agricultural field H1 or the position information PI continuously has a value indicating a position outside the first agricultural field H1 over a first determination period (for example, 1 hour), the specifier 51b specifies, as an end time of the working period, a time indicated by the time information TI corresponding to the last position information PI in the first agricultural field H1.

In a case where the setting mode indicated by the setting mode information remains enabled and where the position information PI changes to a value indicating a position in the first agricultural field H1 within the first determination period from a time at which the position information PI changes from a value indicating a position in the first agricultural field H1 to a value indicating a position outside the first agricultural field H1, the specifier 51b does not specify, as an end time of the working period, the time at which the position information PI changes.

In a case where the setting mode indicated by the setting mode information remains enabled and where the time information TI indicates a later day later than a working day, the specifier 51b specifies, as a latest working time in the working day, a time indicated by the time information TI corresponding to last position information PI in the first agricultural field H1 in the working day, and specifies, as the working period in the later day, a period from a time indicated by the time information TI corresponding to first position information PI in the first agricultural field H1 to a time indicated by the time information TI corresponding to last position information PI in the first agricultural field H1 in the later day.

In a case where the setting mode indicated by the setting mode information remains enabled and where the position information PI changes to a value indicating a position in the first agricultural field H1 on the same day as a day including a time at which the position information PI changes from a value indicating a position in the first agricultural field H1 to a value indicating a position outside the first agricultural field H1, the specifier 51b specifies, as the working period of the working vehicle 1, a sum of a preceding working period and a subsequent working period in the same day in the first agricultural field H1, regardless of whether the setting mode indicated by the setting mode information is enabled or disabled.

In a case where the setting mode indicated by the setting mode information remains enabled and where the position information PI changes from a value indicating a position in the first agricultural field H1 to a value indicating a position in the second agricultural field H2 or the position information PI continuously has a value indicating a position in the second agricultural field H2 over a second determination period, the specifier 51b specifies, as a start time of the working period, a time indicated by the time information TI corresponding to first position information PI in the second agricultural field H2.

Figure 15A:
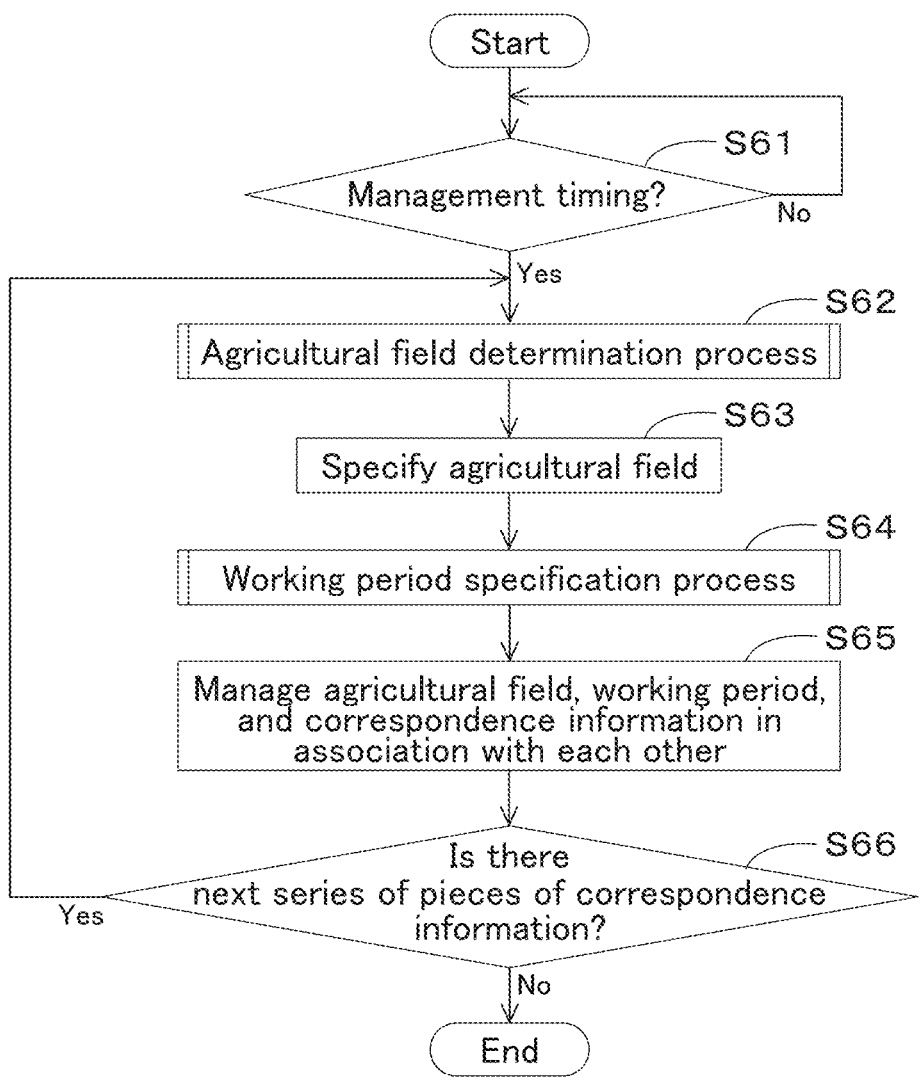
FIG. 15A is a flowchart illustrating an example of a working period management process according to the second preferred embodiment of the present invention.

Now, a description will be given of information management in the server 50 of the management system S according to the second preferred embodiment. FIG. 15A is a flowchart illustrating an example of a working period management process according to the second preferred embodiment. As in the first preferred embodiment, the server 50 receives, by the second communicator 52, a plurality of pieces of correspondence information RD transmitted by the first communicator 42 of the working vehicle 1, and causes the second memory 53 to store the plurality of pieces of correspondence information RD. Here, a description will be given of a case where the setting switch 17 illustrated in FIG. 14 is turned ON when the working vehicle 1 enters the first agricultural field H1 (the setting switch 17 may or may not be turned OFF when the working vehicle 1 exits the first agricultural field H1), and the working vehicle 1 performs work in the first agricultural field H1 (the work may or may not be completed), as illustrated in FIG. 9A.

As illustrated in FIG. 15A, the information manager 51a determines whether a management timing has come (S61). When determining that a management timing has not come (No in S61), the information manager 51a returns to S61 and waits until a management timing comes.

On the other hand, if the information manager 51a determines that a management timing has come (Yes in S61), the specifier 51b performs a process of determining an agricultural field H by using the plurality of pieces of correspondence information RD stored in the second memory 53 (S62).

Figure 15B:
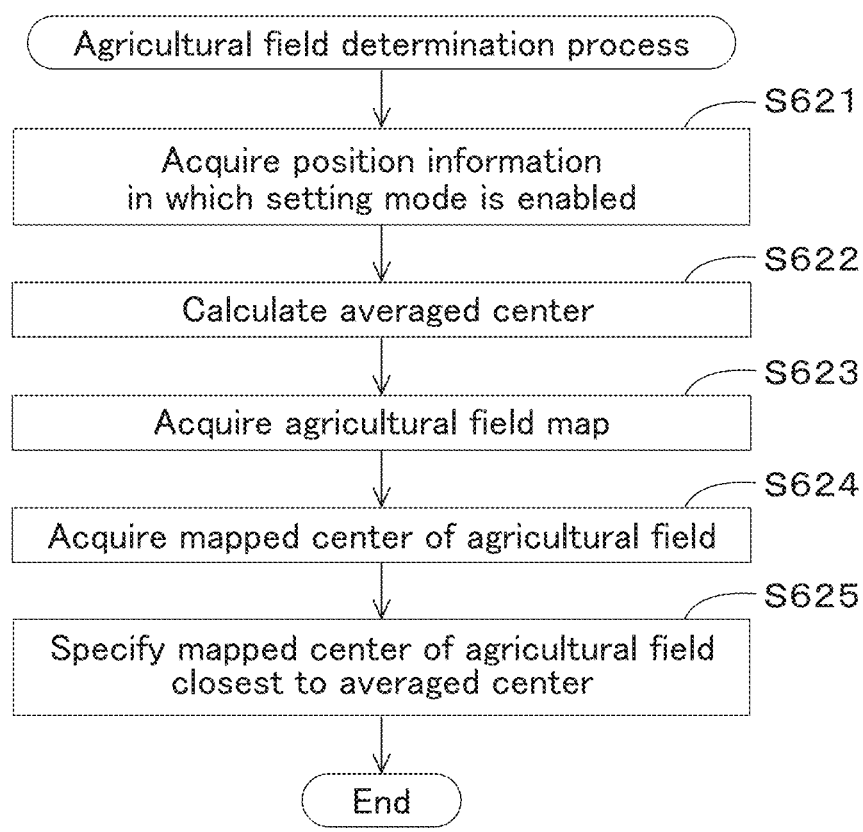
FIG. 15B is a flowchart illustrating an example of an agricultural field determination process according to the second preferred embodiment of the present invention.

The process of determining an agricultural field H will be described with reference to FIG. 15B. FIG. 15B is a flowchart illustrating an example of the process of determining an agricultural field H according to the second preferred embodiment. Specifically, the specifier 51b specifies a group of a plurality of pieces of correspondence information RD in which the setting mode indicated by the setting mode information is kept enabled among the plurality of pieces of correspondence information RD stored in the second memory 53, and acquires the position information PI of the specified group of the plurality of pieces of correspondence information RD (S621). That is, the specifier 51b acquires a group of pieces of position information PI obtained when the setting mode is enabled. For example, the specifier 51b may acquire pieces of position information PI of a group of pieces of first correspondence information 1RD included from the time indicated by the time information TI in which the setting mode flag FL1 of the second correspondence information 2RD is ON to the time indicated by the time information TI in which the setting mode flag FL1 of the second correspondence information 2RD is OFF.

Figure 15C:
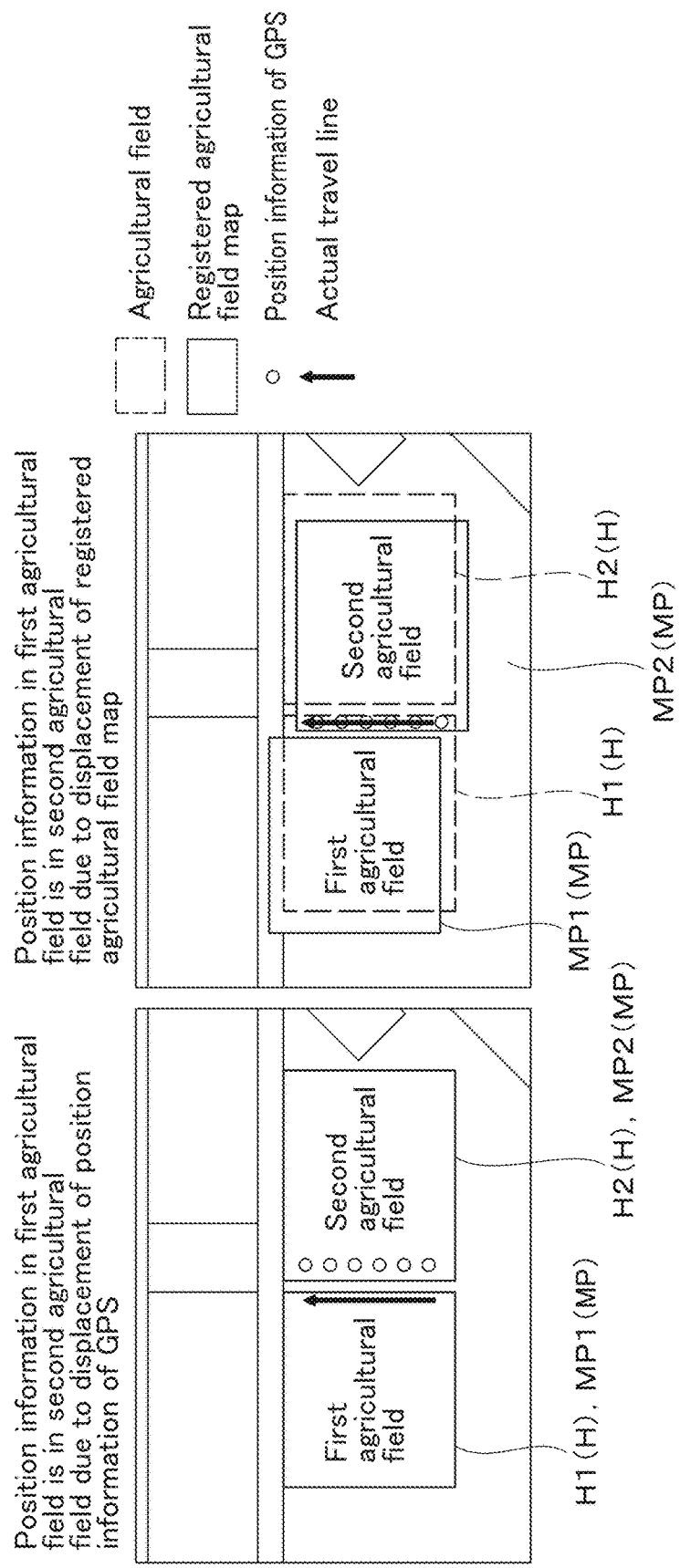
FIG. 15C is a diagram illustrating an example in which a determination is made that position information of the working vehicle is in a second agricultural field when position information of the GPS or an agricultural field map has a displacement.

FIG. 15C is a diagram illustrating an example in which a determination is made that the position information PI of the working vehicle 1 is in the second agricultural field H2 when the position information of the GPS or the agricultural field map MP has a displacement. As illustrated on the left side of FIG. 15C, when the position information PI of the GPS has a displacement, a determination may be made that the position information PI indicated by white dots is located in the second agricultural field H2 even if the working vehicle 1 travels along an actual travel line indicated by the arrow in the first agricultural field H1. As illustrated on the right side of FIG. 15C, when the agricultural field map MP has a displacement, a determination may be made that the position information PI indicated by white dots is located in the second agricultural field H2 on the agricultural field map MP2 even if the working vehicle 1 travels along an actual travel line indicated by the arrow in the first agricultural field H1 and the position information PI of the GPS has no displacement.

Figure 15D:
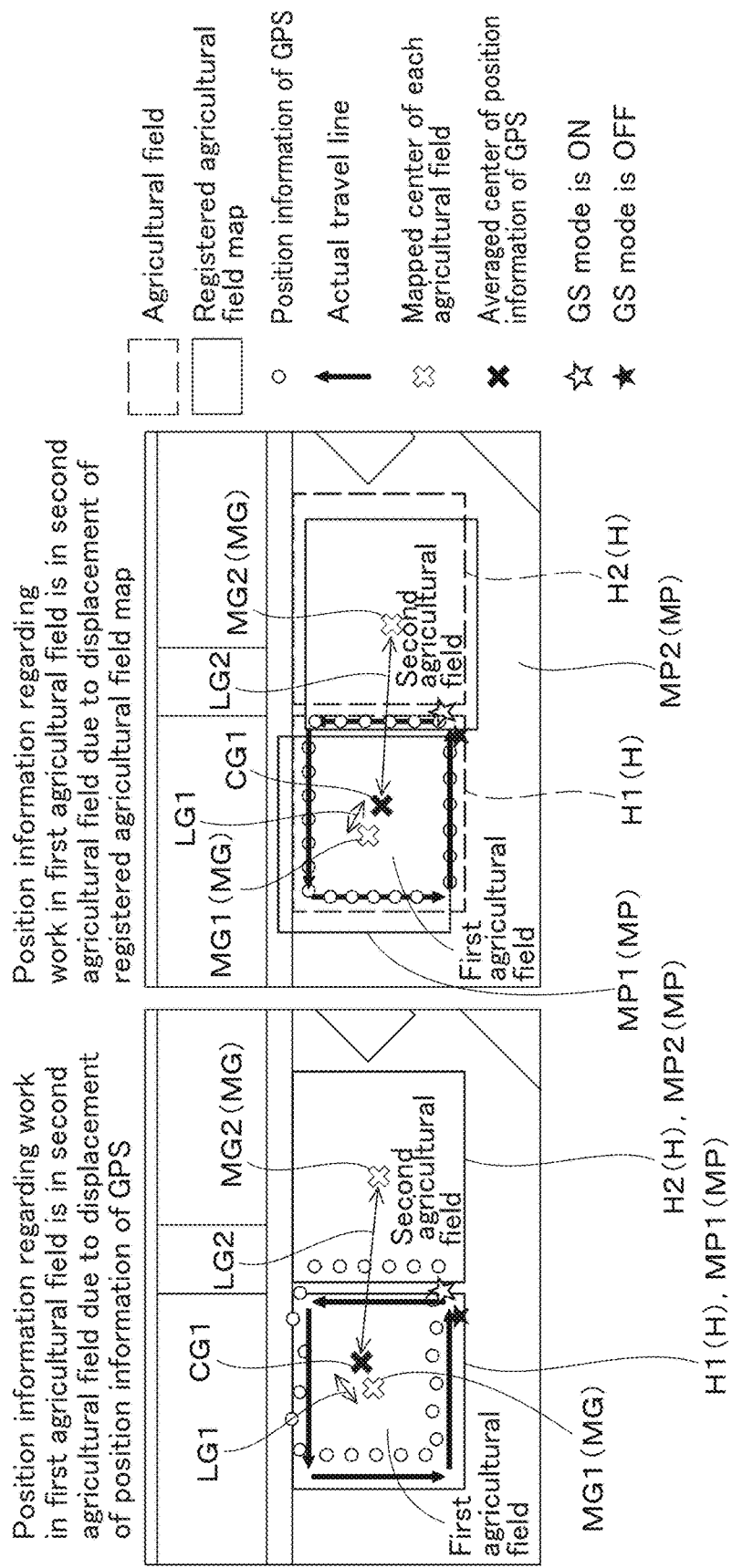
FIG. 15D is a diagram illustrating a case where a correct determination is made that position information of the working vehicle is in a first agricultural field even if position information of the GPS or an agricultural field map has a displacement.

In the second preferred embodiment, S621 to S625 illustrated in FIG. 15B makes it possible to correctly determine that the position information PI of the working vehicle 1 is in the first agricultural field H1 even when the position information PI of the GPS or the agricultural field map MP has a displacement, as illustrated in FIG. 15D. FIG. 15D is a diagram illustrating a case where a correct determination is made that the position information PI of the working vehicle 1 is in the first agricultural field H1 even if the position information PI of the GPS or the agricultural field map MP has a displacement.

The specifier 51b calculates a first averaged center CG1 by using all the pieces of position information PI in a group obtained when the setting mode is enabled (S622). As illustrated in FIG. 9C, the specifier 51b calculates, based on the pieces of position information PI of the plurality of pieces of correspondence information RD1 to RDn−1, the averaged centers of these pieces of position information PI or the averaged center of the shape including these pieces of position information PI, as the first averaged center CG1. To facilitate the understanding of the calculation of the first averaged center CG1, a description will be given here of, as an example, a case where a group of pieces of position information PI obtained when the setting mode is enabled is a plurality of pieces of position information PI corresponding to a movement path of making a round along the inner circumference of the rectangular first agricultural field H1, as illustrated in FIG. 15D. That is, because the working vehicle 1 travels along the inner side of the boundary of the first agricultural field H1 that is rectangular, for example, immediately after entering the first agricultural field H1, the pieces of position information PI of the working vehicle 1 are arranged to form a rectangular shape. The specifier 51b calculates the first averaged center CG1, based on the plurality of pieces of position information PI arranged in a rectangular shape or along an outer shape formed by the plurality of pieces of position information PI (a rectangular or substantially rectangular travel route shape).

The specifier 51b calculates the first averaged center CG1 by using all the pieces of position information PI in a group obtained when the setting mode is enabled, but the present invention is not limited thereto. For example, the specifier 51b may calculate the first averaged center CG1 based on a plurality of pieces of position information PI corresponding to one round along the inner side of the boundary of the first agricultural field H1, or a plurality of pieces of position information PI corresponding to a plurality of pieces of time information TI corresponding to a predetermined initial period immediately after entry into the first agricultural field H1, as illustrated in FIG. 15D. The specifier 51b may use the center, average, or the like of the plurality of pieces of position information PI as the first averaged center CG1, instead of the first averaged center CG1 of the plurality of pieces of position information PI.

The specifier 51b acquires the agricultural field map MP indicating the agricultural field H stored in the map memory 54 (S623). For example, as illustrated in FIG. 15D, the specifier 51b acquires the agricultural field map MP1 indicating the first agricultural field H1 and the agricultural field map MP2 indicating the second agricultural field H2.

The specifier 51b acquires the mapped center MG of the acquired agricultural field map MP (S624). Specifically, supplementary information indicating the mapped center of the agricultural field H is stored in advance in the map memory 54 in association with the agricultural field map MP. The supplementary information is information indicating the position of the center of the agricultural field H. Specifically, in the map memory 54, supplementary information indicating the mapped center MG1 of the first agricultural field H1 is associated with the agricultural field map MP1 indicating the first agricultural field H1, and supplementary information indicating the mapped center MG2 of the second agricultural field H2 is associated with the agricultural field map MP2 indicating the second agricultural field H2. Thus, the specifier 51b acquires the mapped center MG (the position of the mapped center) of each agricultural field H based on the supplementary information. Specifically, the specifier 51b acquires the mapped center MG1 of the first agricultural field H1 by using the supplementary information of the agricultural field map MP1, and acquires the mapped center MG2 of the second agricultural field H2 by using the supplementary information of the agricultural field map MP2. The specifier 51b acquires the mapped center MG1 of the first agricultural field H1 and the mapped center MG2 of the second agricultural field H2, as illustrated in FIG. 15D. When supplementary information (i.e., information indicating the position of the mapped center of the agricultural field H) is not stored for the agricultural field map MP, the specifier 51b is capable of obtaining the position of the mapped center of the agricultural field H by using the latitude and longitude (map data) corresponding to the contour line (individual sides) of the agricultural field H.

The specifier 51b specifies the mapped center closest to the first averaged center CG1 among the mapped centers MG of the plurality of agricultural fields H included in the agricultural field map MP (S625). In FIG. 15D, the specifier 51b calculates a first straight line distance LG1 that connects, in the shortest distance, the first averaged center CG1 and the mapped center MG1 of the first agricultural field H1, based on the position of the first averaged center CG1 and the position of the mapped center MG1 of the first agricultural field H1. The specifier 51b calculates a second straight line distance LG2 that connects, in the shortest distance, the first averaged center CG1 and the mapped center MG2 of the second agricultural field H2, based on the position of the first averaged center CG1 and the position of the mapped center MG2 of the second agricultural field H2. The specifier 51b compares the first straight line distance LG1 with the second straight line distance LG2, and specifies the shortest straight line distance among these straight line distances. Here, it is determined that the first straight line distance LG1 is shorter than the second straight line distance LG2, and thus the specifier 51b specifies the mapped center MG1 of the first agricultural field H1 which is closest to the first averaged center CG1.

Referring back to FIG. 15A, the specifier 51b specifies the first agricultural field H1 having the mapped center MG1 specified to be closest to the first averaged center CG1 (S63).

Figure 15E:
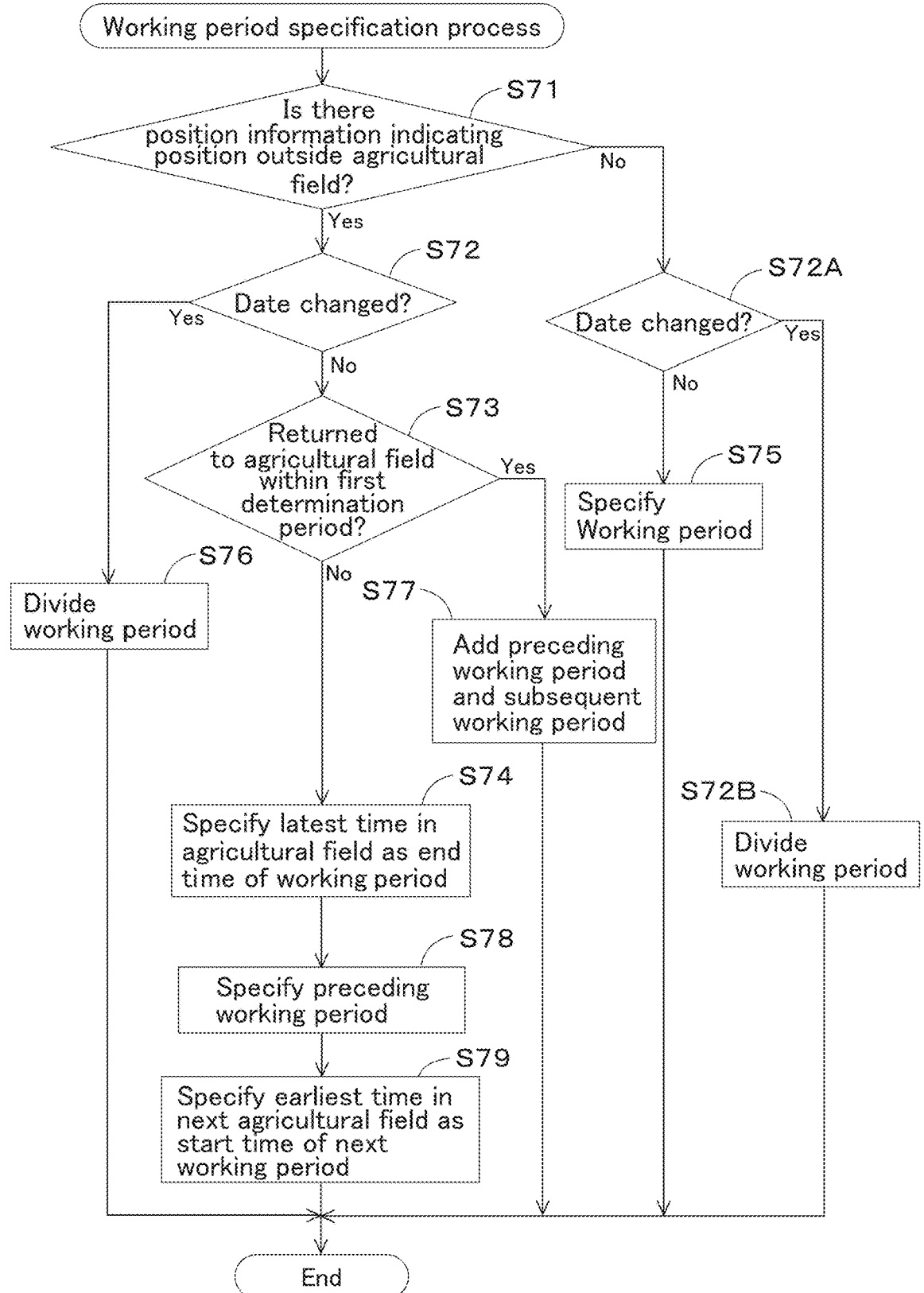
FIG. 15E is a flowchart illustrating an example of a working period specification process according to the second preferred embodiment of the present invention.

The specifier 51b executes a working period specification process (S64). The specifier 51b specifies the working period of the working vehicle 1 based on the time information associated with the position information PI located in the specified first agricultural field H1. The working period specification process will be described with reference to FIG. 15. FIG. 15E is a flowchart illustrating an example of a working period specification process according to the second preferred embodiment.

As illustrated in FIG. 15E, the specifier 51b determines, among the pieces of position information PI of a series of pieces of correspondence information RD in which the setting mode is enabled, whether there is a piece of position information PI other than a piece of position information PI indicating a position in the first agricultural field H1 specified by the specifier 51b, that is, whether there is a piece of position information PI indicating a position outside the first agricultural field H1 (S71). When determining that there is a piece of position information PI indicating a position outside the first agricultural field H1 (Yes in S71), the specifier 51b determines, for the pieces of time information TI of the series of pieces of correspondence information RD, whether there is a change in date (S72). When determining that there is no change in date (No in S72), the specifier 51b determines whether the working vehicle 1 returned to the first agricultural field H1 within a first determination period (S73). For example, the specifier 51b specifies the time at which the working vehicle 1 is located outside the first agricultural field H1 based on the pieces of time information TI of the series of pieces of correspondence information RD, and determines whether the time is within the first determination period.

When determining that the working vehicle 1 did not return to the first agricultural field H1 within the first determination period (No in S73), the specifier 51b specifies pieces of correspondence information RD including the position information PI indicating a position inside the first agricultural field H1 among the series of pieces of correspondence information RD, and sets the latest time in the first agricultural field H1 among the pieces of correspondence information RD in the first agricultural field H1 as the end time of the working period (S74). For example, if the operator of the working vehicle 1 forgets to disable the setting mode, exits the first agricultural field H1, and does not return to the first agricultural field H1 within the first determination period, in other words, if the working vehicle 1 exits the first agricultural field H1 and does not return to the first agricultural field H1 within the first determination period with the setting mode remaining enabled, the time of the exit from the first agricultural field H1 can be regarded as the end time of the working period.

On the other hand, when determining in step S72 that there is a change in date (Yes in S72), that is, the time information TI indicates a day later than the working day, the specifier 51b specifies the time indicated by the time information TI corresponding to the last position information PI in the first agricultural field H1 on the working day as the latest working time in the working day, and specifies, as a working period in the later day, the period from the time indicated by the time information TI corresponding to the first position information PI in the first agricultural field H1 to the time indicated by the time information TI corresponding to the last position information PI in the first agricultural field H1 in the later day (S76). For example, the specifier 51*b* divides the series of pieces of correspondence information RD into a first group in which the time information TI indicates a working day and a second group in which the time information TI indicates a day later than the working day, specifies the latest time among the plurality of pieces of time information TI in the first group as the latest working time in the working day, specifies the working period of the working day, and specifies the period from the time indicated by the time information TI corresponding to the first position information PI in the first agricultural field H1 to the time indicated by the time information TI corresponding to the last position information in the first agricultural field H1 among the plurality of pieces of time information TI in the second group as the working period in the later day.

On the other hand, when determining in S71 that there is no piece of position information PI indicating a position outside the first agricultural field H1 (agricultural field H) among the pieces of position information PI of the series of pieces of correspondence information RD (No in S71), the specifier 51*b* determines whether there is a change in date in the pieces of time information TI of the series of pieces of correspondence information RD (S72A). When determining that there is no change in date (No in S72A), the specifier 51*b* specifies, as a working period, the period from the time indicated by the first time information TI to the time indicated by the last time information TI in the series of pieces of correspondence information RD (S75), and ends the process. For example, if the operator of the working vehicle 1 disables the setting mode when exiting the first agricultural field H1, that is, if the setting switch 17 is correctly operated at the entry into and exit from the first agricultural field H1, the working period in the first agricultural field H1 can be correctly specified.

On the other hand, when determining in step S72A that there is a change in date (Yes in S72A), that is, the time information TI indicates a day later than the working day, the specifier 51*b* specifies the time indicated by the time information TI corresponding to the last position information PI in the first agricultural field H1 in the working day as the latest work time in the working day, and specifies, as a working period in the later day, the period from the time indicated by the time information TI corresponding to the first position information PI in the first agricultural field H1 to the time indicated by the time information TI corresponding to the last position information PI in the first agricultural field H1 in the later day (S72B). For example, the specifier 51*b* divides the series of pieces of correspondence information RD into a first group in which the time information TI indicates a working day and a second group in which the time information TI indicates a day later than the working day, specifies the latest time among the plurality of pieces of time information TI in the first group as the latest working time in the working day, specifies the working period of the working day, and specifies the period from the time indicated by the time information TI corresponding to the first position information PI in the first agricultural field H1 to the time indicated by the time information TI corresponding to the last position information in the first agricultural field H1 among the plurality of pieces of time information TI in the second group as the working period in the later day. For example, if the operator of the working vehicle 1 leaves the working vehicle 1 in the first agricultural field H1 with the setting mode remaining enabled (forgotten to be disabled), and performs work on the next day or later, the working period can be divided by date.

When determining in S73 that the working vehicle 1 returned to the agricultural field H within the first determination period (Yes in S73), the specifier 51*b* adds the preceding working period and the subsequent working period into a working period (S77), and ends the process. For example, if the working vehicle 1 once exits the first agricultural field H1 and then returns with the setting mode remaining enabled (i.e., if the working vehicle 1 returns within the first determination period), the time of exit from the first agricultural field H1 is not regarded as the end time of the working period, and the working period can be continuously managed. More specifically, if the working vehicle 1 once exits the first agricultural field H1 and then returns within the first determination period, the working period before the exit from the first agricultural field H1 and the following working period after the reentry are added into one working period.

After S74, the specifier 51*b* specifies, as a preceding working period, the period from the time indicated by the first time information TI in the series of pieces of correspondence information RD to the end time of the preceding working period specified in S74 (the latest time in the first agricultural field H1) (S78). For example, even if the operator of the working vehicle 1 enters the second agricultural field H2 while forgetting to disable the setting mode, that is, even if the working vehicle 1 exits the first agricultural field H1 and enters the second agricultural field H2 with the setting mode remaining enabled, the time at which the working vehicle 1 enters the second agricultural field H2 can be regarded as the start time of the working period. After S78, the specifier 51*b* specifies the earliest time in the next agricultural field H (the second agricultural field H2) as the start time of the next working period (S79), and ends the process.

Referring back to FIG. 15A, the information manager 51*a* manages the agricultural field H specified by the specifier 51*b*, the working period specified by the specifier 51*b*, and the correspondence information RD in the second memory 53 corresponding to the working period in the first agricultural field H1 in association with each other (S65). FIG. 16 is a diagram illustrating an example of data in which the agricultural field H, the working period, and the setting information SI are associated with each other. As illustrated in FIG. 16, the information manager 51*a* generates data in which agricultural field information HI indicating the first agricultural field H1 (agricultural field number H01), working period information WI indicating a working period, and setting information SI of correspondence information RD are associated with each other (i.e., first agricultural field work data FWI1), and causes the second memory 53 to store the data. The working period information WI indicates the period from the time of entry into the first agricultural field H1 to the time of exit from the first agricultural field H1. The first agricultural field work data FWI1 may be data from which redundant information has been deleted, as in the first preferred embodiment.

The specifier 51*b* determines whether there is the next series of pieces of correspondence information RD (S66). When determining that there is the next series of pieces of correspondence information RD (Yes in S66), the specifier 51*b* returns to S62. The specifier 51*b* executes S62 to S64 described above, and specifies the working period in the second agricultural field H2. Subsequently, the information manager 51*a* manages the agricultural field H specified by the specifier 51*b*, the working period in the second agricultural field H2 specified by the specifier 51*b*, and the correspondence information RD in the second memory 53 corresponding to the working period in the second agricultural field H2 in association with each other (S65). That is, as illustrated in FIG. 16, the information manager 51a generates data in which agricultural field information HI indicating the second agricultural field H2 (agricultural field number H02), working period information WI indicating a working period, and setting information SI of correspondence information RD are associated with each other (i.e., second agricultural field work data FWI2), and causes the second memory 53 to store the data. The first agricultural field work data FWI1 and the second agricultural field work data FWI2 may be data from which redundant information has been deleted, as in the first preferred embodiment. For example, the plurality of pieces of correspondence information RD stored in units of agricultural fields may include first correspondence information 1RD and second correspondence information 2RD that have been thinned out, and third correspondence information 3RD from which information overlapping with the preceding information has been deleted.

When determining that there is not the next series of pieces of correspondence information RD (No in S66), the specifier 51b ends the process.

The management system S according to the second preferred embodiment described above includes the working vehicle 1 and the server 50. The working vehicle 1 includes the setting switch 17 to enable or disable the setting mode of performing setting before start of automatic steering, the first memory 41 to store correspondence information RD in which setting mode information indicating whether the setting mode is enabled or disabled, time information TI measured by the timer 40a, position information PI of the vehicle body 3, and setting information SI of the working vehicle 1 are associated with each other, and the first communicator 42 to transmit the correspondence information RD stored in the first memory 41 to the server 50. The server 50 includes the second communicator 52 to receive the correspondence information RD transmitted by the first communicator 42, the second memory 53 to store the correspondence information RD received by the second communicator 52, and the information manager 51a to manage the correspondence information RD stored in the second memory 53, based on the setting mode information. With this configuration, the information manager 51a manages the correspondence information RD stored in the second memory 53 based on the setting mode information. That is, the storage of the time information TI and the position information PI is managed based on the setting mode information. For example, it is possible to store the time information TI and the position information PI obtained when the setting mode is enabled. Thus, the time information TI and the position information PI can be appropriately managed in accordance with the setting mode.

The server 50 includes the map memory 54 to store an agricultural field map MP, and the specifier 51b. The specifier 51b specifies a working period of the working vehicle 1 based on the time information TI associated with a group of pieces of the position information PI arranged in a chronological order and associated with the setting mode information (setting mode flag FL1) indicating that the setting mode is enabled in the correspondence information RD stored in the second memory 53, calculates a first averaged center CG1 by analyzing the group of pieces of the position information PI, specifies a closest mapped center MG closest to the first averaged center CG1 among the mapped centers of a plurality of agricultural fields H included in the agricultural field map MP, and specifies an agricultural field H having the closest mapped center MG as an agricultural field H in which the working vehicle 1 has worked. With this configuration, the specifier 51b specifies, as the agricultural field H in which the working vehicle 1 has worked, the agricultural field H having the mapped center MG closest to the first averaged center CG1 specified by the position information PI obtained when the setting mode is enabled. Thus, the agricultural field H can be accurately specified even if the position information PI has a displacement or if the agricultural field map MP has a displacement.

The information manager 51a associates the agricultural field H specified by the specifier 51b, the working period specified by the specifier 51b, and the correspondence information RD corresponding to the working period in the second memory 53 with each other. With this configuration, the server 50 is capable of managing an agricultural field H, a working period, and correspondence information RD corresponding to the working period in association with each other.

The agricultural field map MP includes at least the first agricultural field H1. In a case where the setting mode indicated by the setting mode information remains enabled and where the position information PI changes from a value indicating a position in the first agricultural field H1 to a value indicating a position outside the first agricultural field H1 or the position information PI continuously has a value indicating a position outside the first agricultural field H1 over a first determination period, the specifier 51b specifies, as an end time of the working period, a time indicated by the time information TI corresponding to last position information PI in the first agricultural field H1. With this configuration, if the operator of the working vehicle 1 exits the first agricultural field H1 while forgetting to disable the setting mode, that is, if the working vehicle 1 exits the first agricultural field H1 with the setting mode remaining enabled, the time at which the working vehicle 1 exits the first agricultural field H1 can be regarded as the end time of the working period. Accordingly, the working period can be appropriately divided in units of agricultural fields.

In a case where the setting mode indicated by the setting mode information remains enabled and where the position information PI changes to a value indicating a position in the first agricultural field H1 within the first determination period from a time at which the position information PI changes from a value indicating a position in the first agricultural field H1 to a value indicating a position outside the first agricultural field H1, the specifier 51b does not specify, as an end time of the working period, the time at which the position information PI changes. With this configuration, if the working vehicle 1 temporarily exits and then returns to the first agricultural field H1 with the setting mode remaining enabled, the time of exit from the first agricultural field H1 is not regarded as the end time of the working period, and the working period can be continuously managed. Thus, it is possible to prevent the working period from being inappropriately divided. Thus, the working period can be appropriately divided in units of agricultural fields.

In a case where the setting mode indicated by the setting mode information remains enabled and where the time information TI indicates a later day later than a working day, the specifier 51b specifies, as a latest working time in the working day, a time indicated by the time information TI corresponding to last position information PI in the first agricultural field H1 in the working day, and specifies, as the working period in the later day, a period from a time indicated by the time information TI corresponding to first position information PI in the first agricultural field H1 to a time indicated by the time information TI corresponding to last position information in the first agricultural field H1 in the later day. With this configuration, if the operator of the working vehicle 1 leaves the working vehicle 1 in the agricultural field with the setting mode remaining enabled (forgotten to be disabled), and performs work on the next day or later, the working period can be divided by date. Accordingly, the working period can be appropriately divided based on dates.

In a case where the setting mode indicated by the setting mode information is disabled and where the position information PI changes to a value indicating a position in the first agricultural field H1 on the same day as a day including a time at which the position information PI changes from a value indicating a position in the first agricultural field H1 to a value indicating a position outside the first agricultural field H1, the specifier 51b distinguishes a preceding working period and a subsequent working period in the same day in the first agricultural field H1 from each other. With this configuration, if the setting mode is correctly operated at the entry into and exit from the first agricultural field H1, and the working vehicle 1 once exits and then returns to the first agricultural field H1 on the same day, the preceding working period defined by the exit from the first agricultural field H1 and the subsequent working period generated by reentry can be regarded as working periods different from each other. That is, as a result of the setting mode being switched to be disabled, the working periods in the same day can be managed as working periods different from each other. Thus, the working period can be appropriately divided in units of setting modes.

In a case where the setting mode indicated by the setting mode information remains enabled and where the position information PI changes to a value indicating a position in the first agricultural field H1 on the same day as a day including a time at which the position information PI changes from a value indicating a position in the first agricultural field H1 to a value indicating a position outside the first agricultural field H1, the specifier 51b specifies, as the working period of the working vehicle 1, a sum of a preceding working period and a subsequent working period in the same day in the first agricultural field H1. With this configuration, if the setting mode remains enabled and the working vehicle 1 once exits and then returns to the first agricultural field H1 on the same day, the preceding working period defined by the exit from the first agricultural field H1 and the subsequent working period generated by reentry can be added together into one working period. It is possible to prevent a plurality of working periods from being generated on the same day. Thus, the working period can be appropriately divided in units of working days.

In a case where the setting mode indicated by the setting mode information remains enabled and where the position information PI changes from a value indicating a position in the first agricultural field H1 to a value indicating a position in the second agricultural field H2 or the position information PI continuously has a value indicating a position in the second agricultural field H2 over a second determination period, the specifier 51b specifies, as a start time of the working period, a time indicated by the time information TI corresponding to first position information PI in the second agricultural field H2. With this configuration, even if the operator of the working vehicle 1 enters the second agricultural field H2 while forgetting to disable the setting mode, that is, even if the working vehicle 1 exits the first agricultural field H1 and enters the second agricultural field H2 with the setting mode remaining enabled, the time at which the working vehicle 1 enters the second agricultural field H2 can be regarded as the start time of the working period, and the start of a working period can be appropriately defined in units of agricultural fields.

Third Preferred Embodiment

The specifier 51b of the server 50 according to a third preferred embodiment performs, on each of a plurality of pieces of position information PI arranged in a chronological order and associated with the setting mode information (setting mode flag FL1) indicating that the setting mode is enabled in the correspondence information RD stored in the second memory 53, an inside-or-outside determination of determining whether a position indicated by the piece of the position information PI is within an agricultural field H indicated by the agricultural field map MP, thus specifying a corresponding agricultural field H for each of the plurality of pieces of position information PI, and specifies a working period of the working vehicle 1 based on the time information TI associated with a series of pieces of the position information PI for which the same agricultural field H is continuously specified.

Figure 15F:
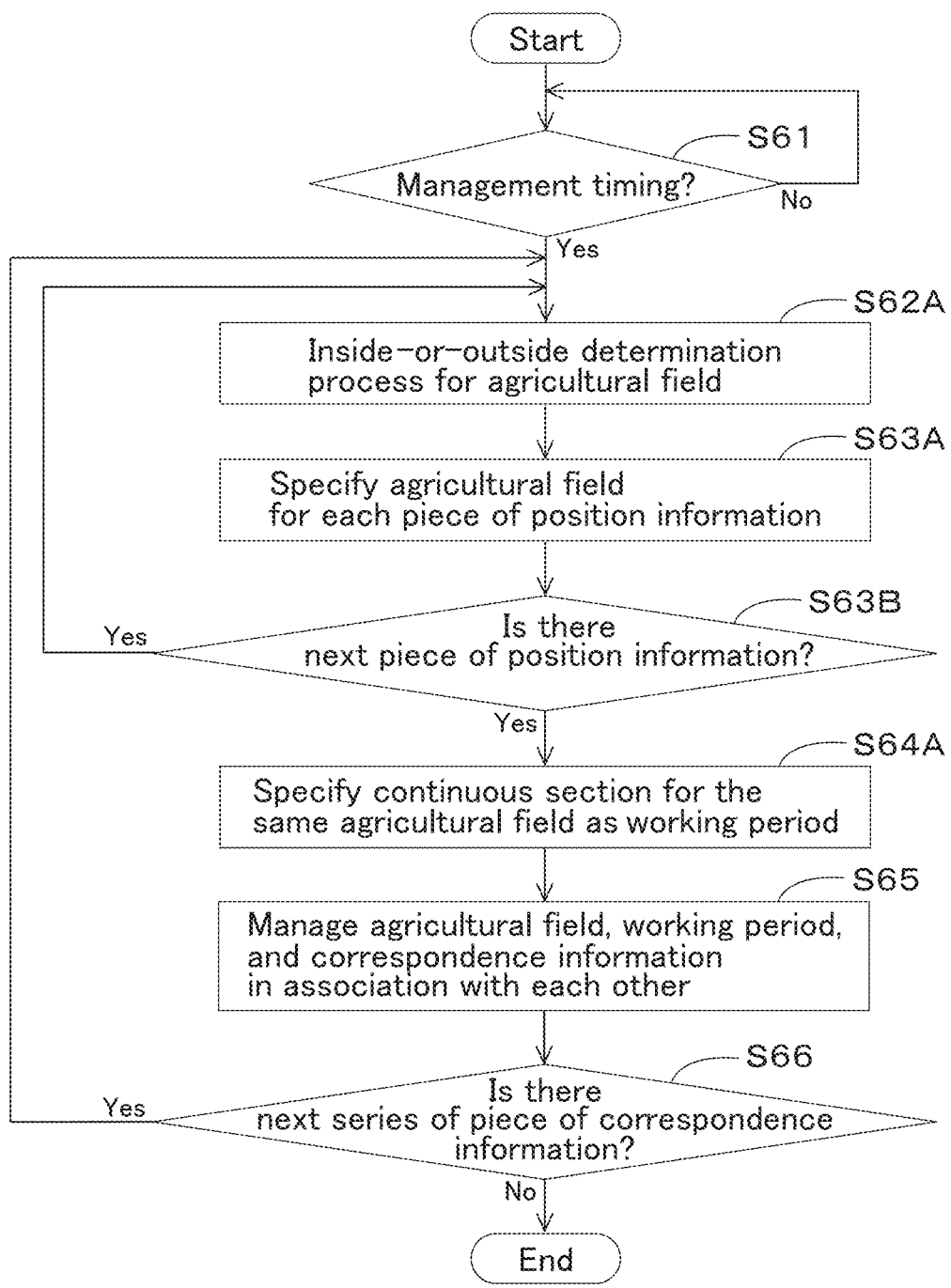
FIG. 15F is a flowchart illustrating an example of a working period management process according to a third preferred embodiment of the present invention.

Now, a description will be given of a working period management process in the server 50 of the management system S according to the third preferred embodiment. FIG. 15F is a flowchart illustrating an example of a working period management process according to the third preferred embodiment.

As illustrated in FIG. 15F, the information manager 51a determines whether a management timing has come (S61). When determining that a management timing has not come (No in S61), the information manager 51a returns to S61 and waits until a management timing comes.

On the other hand, if the information manager 51a determines that a management timing has come (Yes in S61), the specifier 51b performs an inside-or-outside determination process for the agricultural field H by using the plurality of pieces of correspondence information RD stored in the second memory 53 (S62A), and specifies, for each of the plurality of pieces of position information PI, a corresponding agricultural field (S63A). Specifically, the specifier 51b performs, on each of a plurality of pieces of position information PI arranged in a chronological order and associated with the setting mode information indicating that the setting mode is enabled in the plurality of pieces of correspondence information RD stored in the second memory 53, an inside-or-outside determination of determining whether a position indicated by the piece of the position information PI is within an agricultural field H indicated by the agricultural field map MP (S62A), thus specifying a corresponding agricultural field H for each of the plurality of pieces of position information PI (S63A). For example, the specifier 51b may acquire pieces of position information PI of a group of pieces of first correspondence information 1RD included from the time indicated by the time information TI in which the setting mode flag FL1 of the second correspondence information 2RD is ON to the time indicated by the time information TI in which the setting mode flag FL1 of the second correspondence information 2RD is OFF.

Subsequently, the specifier 51b determines whether there is the next piece of position information PI (S63B). When determining that there is the next piece of position information PI (Yes in S63B), the specifier 51b returns to S62A. On the other hand, when determining that there is no next piece of position information PI (No in S63B), the specifier 51b specifies the working period of the working vehicle 1 based on the pieces of time information TI associated with the series of pieces of position information PI for which the same agricultural field H is continuously specified (S64A). That is, the specifier 51b specifies a continuous section for the same agricultural field H as a working period.

The information manager 51a manages the agricultural field H specified by the specifier 51b, the working period specified by the specifier 51b, and the correspondence information RD in the second memory 53 corresponding to the working period in the first agricultural field H1 in association with each other (S65). The specifier 51b determines whether there is the next series of pieces of correspondence information RD (S66). When determining that there is the next series of pieces of correspondence information RD (Yes in S66), the specifier 51b returns to S62A. On the other hand, when determining that there is not the next series of pieces of correspondence information RD (No in S66), the specifier 51b ends the process.

The server 50 of the management system S according to the third preferred embodiment described above includes the map memory 54 to store the agricultural field map MP and the specifier 51b. The specifier 51b performs, on each of a plurality of pieces of the position information PI arranged in a chronological order and associated with the setting mode information (setting mode flag FL1) indicating that the setting mode is enabled in the correspondence information RD stored in the second memory 53, an inside-or-outside determination of determining whether a position indicated by the piece of the position information PI is within an agricultural field H indicated by the agricultural field map MP, thus specifying a corresponding agricultural field H for each of the plurality of pieces of the position information PI, and specifies a working period of the working vehicle 1 based on the time information TI associated with a series of pieces of the position information PI for which the same agricultural field H is continuously specified. With this configuration, the agricultural field H, the working period of the working vehicle 1, and the setting information SI of the working vehicle 1 set in the agricultural field work can be appropriately managed. In addition, because the working period of the working vehicle 1 is specified based on the time information TI associated with the position information PI indicating the position in the agricultural field H, the working period can also be accurately specified.

In response to the steering changeover switch 19 being instructed to start or end automatic steering, the controller 40 may generate correspondence information RD including the setting information SI of the working vehicle 1 and cause the first communicator 42 to transmit the correspondence information RD. That is, the correspondence information RD (the setting information SI of the working vehicle 1, the time information TI, and the position information PI) is transmitted at the start and end of automatic steering. Thus, the start and end of automatic steering can be accurately specified in the server 50.

At least one of the first period or the second period may have a value that varies between manual steering and automatic steering. For example, the first period in automatic steering may be shorter than the first period in manual steering. In this case, the server 50 is capable of acquiring a large amount of correspondence information RD in automatic steering, and is capable of acquiring a small amount of correspondence information RD in manual steering. The second period in manual steering may be longer than the second period in automatic steering. In this case, it is possible to decrease the frequency of transmission of information to the server 50 in manual steering while maintaining the frequency of transmission of information to the server 50 in automatic steering.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A management system comprising:
    a working vehicle; and
    a server;
    the working vehicle including:
        a working device;
        a vehicle body capable of traveling by either automatic steering based on a reference line or manual steering;
        a position detector to detect a position of the vehicle body;
        a timer;
        a first memory to store, in a case where the vehicle body is automatically steered, correspondence information in which time information measured by the timer and at least one of setting information of the working vehicle or position information of the vehicle body are associated with each other; and
        a first communicator to transmit the correspondence information stored in the first memory to the server; and
    the server including:
        a second communicator to receive the correspondence information transmitted by the first communicator;
        a second memory to store the correspondence information received by the second communicator; and
        an information manager to manage information stored in the second memory; wherein
    in a case of a plurality of pieces of the correspondence information having been stored in the second memory in a chronological order based on the time information, the information manager is configured or programmed to:
        keep a piece of the correspondence information of a piece of the setting information different from an immediately preceding piece of the setting information among a plurality of pieces of the setting information arranged in a chronological order; and
        delete a piece of the correspondence information of a piece of the setting information that is the same as an immediately preceding piece of the setting information among the plurality of pieces of the setting information arranged in a chronological order.

2. The management system according to claim 1, wherein the working vehicle includes:
    a steering changeover switch to be instructed to start and end automatic steering;
    an automatic steering mechanism to perform automatic steering of the vehicle body based on the position of the vehicle body detected by the position detector and the reference line, in response to the steering changeover switch being instructed to start automatic steering; and
    a controller to generate the correspondence information and cause the first memory to store the correspondence information, in response to the steering changeover switch being instructed to start or end automatic steering.

3. The management system according to claim 2, wherein the controller is configured or programmed to generate the correspondence information and cause the first memory to store the correspondence information, in response to an instruction to change the setting information of the working vehicle being provided.

4. The management system according to claim 3, wherein every time a predetermined first period elapses, the controller is configured or programmed to generate, as the correspondence information, first correspondence information in which the time information and the position information are associated with each other, and to cause the first memory to store the first correspondence information.

5. The management system according to claim 4, wherein in response to an elapse of a predetermined second period longer than the first period, the controller is configured or programmed to cause the first communicator to transmit, to the server, a plurality of pieces of the correspondence information generated and stored in the first memory in the second period.

6. The management system according to claim 5, wherein
in a case of a plurality of pieces of the correspondence information having been stored in the second memory in a chronological order based on the time information, the information manager is configured or programmed to delete, among a plurality of pieces of the setting information arranged in a chronological order, a piece of the setting information including contents that are the same as contents of an immediately preceding piece of the setting information.

7. The management system according to claim 5, wherein
in a case of a plurality of pieces of the correspondence information having been stored in the second memory in a chronological order based on the time information, the information manager is configured or programmed to delete, among a plurality of pieces of the setting information arranged in a chronological order, a piece of the setting information including contents that are the same as contents of another piece of the setting information within the same day.

8. The management system according to claim 5, wherein
in a case of a plurality of pieces of the first correspondence information having been stored in the second memory in a chronological order based on the time information, the information manager is configured or programmed to perform, every predetermined third period longer than the first period and shorter than the second period, an operation of keeping only one of a plurality of pieces of the first correspondence information included in the third period and deleting others of the plurality of pieces of the first correspondence information included in the third period.

9. The management system according to claim 4, wherein the setting information includes at least one or more of pieces of information including the reference line indicating a travel direction of the working vehicle during automatic steering, a type of work during automatic steering, a width of work during automatic steering, an overlap width which is a width of an overlap of work ranges, a work route indicating a set route, a control gain which is a control parameter during automatic steering, and a setting status regarding setting of the reference line.

10. The management system according to claim 9, wherein
the working vehicle includes a registration switch to set the reference line when the manual steering is being performed; and the controller includes, in the setting information, information on the reference line set by the registration switch.

11. The management system according to claim 2, wherein every time a predetermined first period elapses, the controller is configured or programmed to generate, as the correspondence information, first correspondence information in which the time information and the position information are associated with each other, and to cause the first memory to store the first correspondence information.

12. The management system according to claim 11, wherein in response to an elapse of a predetermined second period longer than the first period, the controller is configured or programmed to cause the first communicator to transmit, to the server, a plurality of pieces of the correspondence information generated and stored in the first memory in the second period.

13. The management system according to claim 12, wherein
in a case of a plurality of pieces of the correspondence information having been stored in the second memory in a chronological order based on the time information, the information manager is configured or programmed to delete, among a plurality of pieces of the setting information arranged in a chronological order, a piece of the setting information including contents that are the same as contents of an immediately preceding piece of the setting information.

14. The management system according to claim 12, wherein
in a case of a plurality of pieces of the correspondence information having been stored in the second memory in a chronological order based on the time information, the information manager is configured or programmed to delete, among a plurality of pieces of the setting information arranged in a chronological order, a piece of the setting information including contents that are the same as contents of another piece of the setting information within the same day.

15. The management system according to claim 12, wherein
in a case of a plurality of pieces of the first correspondence information having been stored in the second memory in a chronological order based on the time information, the information manager is configured or programmed to perform, every predetermined third period longer than the first period and shorter than the second period, an operation of keeping only one of a plurality of pieces of the first correspondence information included in the third period and deleting others of the plurality of pieces of the first correspondence information included in the third period.

16. The management system according to claim 2, wherein the setting information includes at least one or more of pieces of information including the reference line indicating a travel direction of the working vehicle during automatic steering, a type of work during automatic steering, a width of work during automatic steering, an overlap width which is a width of an overlap of work ranges, a work route indicating a set route, a control gain which is a control parameter during automatic steering, and a setting status regarding setting of the reference line.

17. The management system according to claim 16, wherein
the working vehicle includes a registration switch to set the reference line when the manual steering is being performed; and the controller includes, in the setting information, information on the reference line set by the registration switch.

18. The management system according to claim 16, wherein
- in response to a request to transmit the setting information being received from the working vehicle, the server is operable to transmit, by the second communicator, the setting information stored in the second memory to the working vehicle;
- in response to the steering changeover switch being instructed to start automatic steering, the automatic steering mechanism is operable to perform automatic steering of the vehicle body based on the position of the vehicle body detected by the position detector and the setting information received by the first communicator; and
- the working device is operable to perform work based on the setting information received by the first communicator.

* * * * *